(12) United States Patent
Kim et al.

(10) Patent No.: US 10,514,452 B2
(45) Date of Patent: Dec. 24, 2019

(54) RADAR DEVICE AND OPERATION METHOD THEREOF

(71) Applicant: Electronics and Telecommunications Research Institute, Daejeon (KR)

(72) Inventors: Dong Kyoo Kim, Daejeon (KR); Do Wook Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 244 days.

(21) Appl. No.: 15/356,446

(22) Filed: Nov. 18, 2016

(65) Prior Publication Data
US 2017/0146645 A1 May 25, 2017

(30) Foreign Application Priority Data

Nov. 19, 2015 (KR) .................. 10-2015-0162734
Mar. 21, 2016 (KR) .................. 10-2016-0033579

(51) Int. Cl.
*G01S 13/02* (2006.01)
*G01S 7/292* (2006.01)
(Continued)

(52) U.S. Cl.
CPC .......... *G01S 13/0209* (2013.01); *G01S 7/292* (2013.01); *G01S 7/354* (2013.01); *G01S 13/003* (2013.01);
(Continued)

(58) Field of Classification Search
CPC .. G01S 13/003; G01S 13/0209; G01S 13/347; G01S 13/88; G01S 13/885; G01S 7/292; G01S 7/32; G01S 7/354
(Continued)

(56) References Cited

U.S. PATENT DOCUMENTS 7,257,334 B1 8/2007 Weitzel
8,860,605 B2 10/2014 Lellouch et al.
(Continued)

FOREIGN PATENT DOCUMENTS

EP  1 393 098  3/2004
EP  2 446 297  5/2012
(Continued)

*Primary Examiner* — Timothy X Pham

(57) ABSTRACT

Provided is a radar device. The radar device includes a raising frequency converter configured to raise frequencies of split channel signals from a baseband to a different passband on the basis of a channel frequency, a transmission antenna configured to transmit the split channel signals received from the raising frequency converter to a target object, a reception antenna configured to receive split channel reflection signals received from the target object, a lowering frequency converter configured to lower the frequencies of the split channel reflection signals from a different passband to a baseband on the basis of the channel frequency, a transmission/reception driving unit configured to data-frame the split channel reflection signals received from the lowering frequency converter, and a device control unit configured to generate an integrated band response signal by using the data-framed split channel reflection signals.

16 Claims, 23 Drawing Sheets

(51) Int. Cl.
*G01S 7/35* (2006.01)
*G01S 13/00* (2006.01)
*G01S 13/34* (2006.01)
*G01S 13/88* (2006.01)
*G01S 7/32* (2006.01)

(52) U.S. Cl.
CPC ............ *G01S 13/347* (2013.01); *G01S 13/88* (2013.01); *G01S 7/32* (2013.01); *G01S 13/885* (2013.01)

(58) Field of Classification Search
USPC .......................................................... 342/21
See application file for complete search history.

(56) References Cited

U.S. PATENT DOCUMENTS

| | | | |
|---|---|---|---|
| 9,470,783 | B2 | 10/2016 | Kim |
| 2005/0213977 | A1* | 9/2005 | Ikushima ............ H04J 14/0298 398/79 |
| 2006/0132348 | A1* | 6/2006 | Valand ..................... G01S 5/04 342/13 |
| 2015/0198702 | A1 | 7/2015 | Kim |
| 2015/0309167 | A1 | 10/2015 | Shikatani et al. |
| 2016/0270660 | A1* | 9/2016 | Bandy .................. A61B 5/6861 |
| 2016/0306034 | A1* | 10/2016 | Trotta .................. H01Q 9/0407 |

FOREIGN PATENT DOCUMENTS

| | | |
|---|---|---|
| EP | 2 932 296 | 10/2015 |
| JP | 2000107372 A | 4/2000 |
| JP | 2002544553 A | 12/2002 |
| JP | KR20130047979 A | 5/2013 |
| KR | 10-2014-0095615 A | 8/2014 |
| KR | 10-2015-0051118 A | 5/2015 |
| KR | 10-2016-0103380 A | 9/2016 |
| WO | WO 02/086542 A2 | 10/2002 |
| WO | WO 2010/151125 A1 | 12/2010 |
| WO | WO 2014/098660 A1 | 6/2014 |

* cited by examiner

RADAR DEVICE AND OPERATION METHOD THEREOF

CROSS-REFERENCE TO RELATED APPLICATIONS

This U.S. non-provisional patent application claims priority under 35 U.S.C. § 119 of Korean Patent Application Nos. 10-2015-0162734, filed on Nov. 19, 2015, and 10-2016-0033579, filed on Mar. 21, 2016, the entire contents of which are hereby incorporated by reference.

BACKGROUND

The present disclosure herein relates to a radar device and an operation method thereof, and more particularly, to a radar device for transmitting and receiving radar signals by using a split channel method and an operation method thereof.

A penetration radar device is one of devices used for non-destructing tests. The penetration radar device projects an RF penetration signal to a penetration target object and then receives a reflected signal so as to sense a state of the inner surface of the penetration target object. A method of a penetration radar device to obtain a reflective signal includes an impulse method and a step frequency method.

The impulse method uses a signal having a great energy in a very short time, that is, an impulse signal, as a penetration signal. A projected impulse signal has broadband frequency characteristics. Herein, as the bandwidth of a frequency becomes broader, high-resolution target inner sensing is possible. Additionally, since the impulse method projects a broadband signal at a time instantaneously, sensing may be performed at a very high speed in general.

The step frequency method provides effects as if it projects a broadband signal over all by projecting a Continuous Wave (CW) signal (that is, sine wave) at uniform frequency intervals within a specific frequency band so as to sense the inner surface of a target. Unlike the impulse method of projecting a broadband signal at once instantaneously, the step frequency method divides the frequency of a CW signal by a step according to a time flow and then, raises or lowers the divided frequency to generate a broadband signal. As a result, it takes a time to generate one broadband signal and in comparison to the impulse method, sensing is performed at a very slow speed in general.

Moreover, since a generated signal has excellent frequency band characteristics and signal generation is possible at high power, the step frequency method has an advantage in obtaining a high-resolution penetration signal but as mentioned above, very-slow speed sensing is possible.

SUMMARY

The present disclosure provides a radar device for scanning a target object at a high speed and also improving the accuracy of an impulse response and an operation method thereof.

An embodiment of the inventive concept provides a radar device including: a raising frequency converter configured to raise each of frequencies of a plurality of split channel signals from a baseband to a different passband on the basis of a channel frequency; a transmission antenna configured to transmit the plurality of split channel signals received from the raising frequency converter to a target object; a reception antenna configured to receive a plurality of split channel reflection signals received from the target object; a lowering frequency converter configured to lower the frequencies of the plurality of split channel reflection signals from different passbands to a baseband on the basis of the channel frequency; a transmission/reception driving unit configured to data-frame the plurality of split channel reflection signals received from the lowering frequency converter; and a device control unit configured to generate an integrated band response signal by using the plurality of data-framed split channel reflection signals.

In an embodiment of the inventive concept, operation method of a radar device includes: selecting one operating mode among a continuous scan mode for performing a continuous scan operation on the target object, an interference recognition mode for determining whether an external interference signal different from the plurality of split channel reflection signals is received, and a calibration mode for measuring frequency characteristics of the raising frequency converter and the lowering frequency converter; performing an initialization operation on the radar device; controlling an amplifier gain of a raising frequency converter and a lowering frequency converter in the radar device; and performing a radar scan operation on the target object by transmitting/receiving a plurality of split channel signals to/from the target object.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments will be described in more detail with reference to the accompanying drawings so that those skilled in the art easily carry out the technical idea of the inventive concept.

Figure 1:
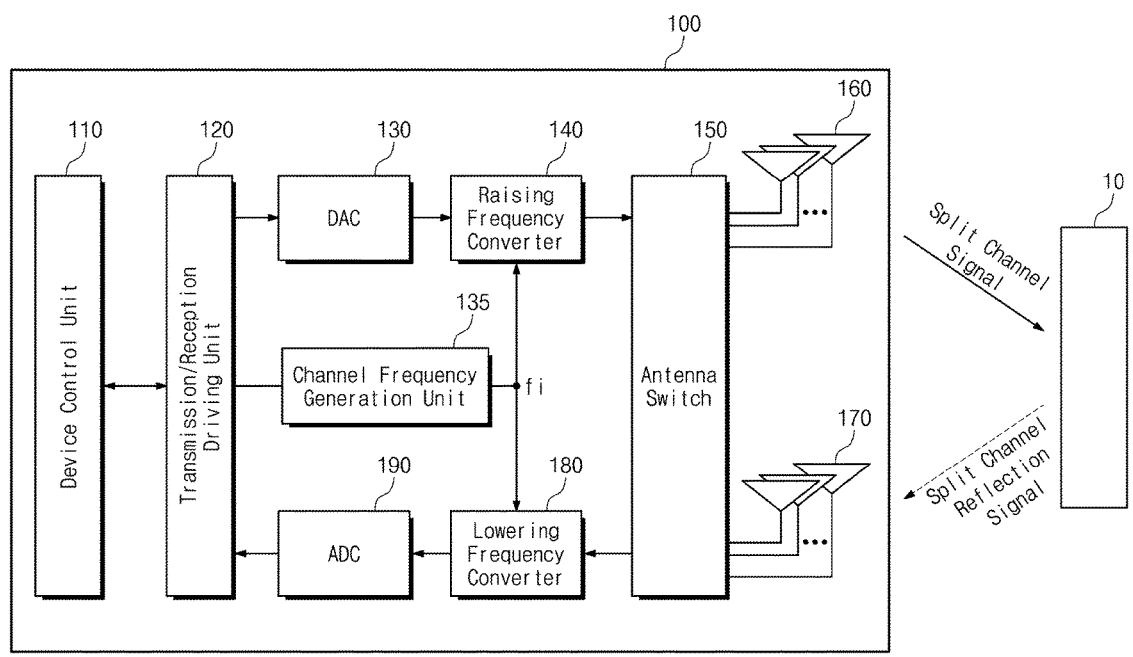
FIG. 1 is a block diagram illustrating a radar device exemplarily according to an embodiment of the technical scope of the inventive concept.

FIG. 1 is a block diagram illustrating a radar device 100 exemplarily according to an embodiment of the technical scope of the inventive concept.

Referring to FIG. 1, the radar device 100 includes a device control unit 110, a transmission/reception driving unit 120, a digital to analog converter (hereinafter referred to as a DAC) 130, a raising frequency converter 140, an antenna switch 150, a transmission antenna 160, a reception antenna 170, a lowering frequency converter 180, and an analog to digital converter (hereinafter referred to as an ADC) 190.

The device control unit 110 manages overall operations of the radar device 100. For example, the device control unit 110 may control a setting of each component of the radar device 100 according to an operating mode selected from a calibration mode, an interference recognition mode, and a continuous scan mode. As another example, the device control unit 110 may determine a data type to be transmitted to the transmission/reception driving unit 120 according to a function selected from a system initialization function, a gain control function, and a radar scan function.

Additionally, the device control unit 110 is connected to the transmission/reception driving unit 120 so as to transmit split channel signals to the transmission/reception driving unit 120 or receive split channel reflection signals from the transmission/reception driving unit 120. The device control unit 110 generates an integrated band response signal by using the received split channel reflection signals. The device control unit 110, for example, may be implemented as a logic circuit or a processor.

In order to transmit split channel signals or receive split channel reflection signals according to a control of the device control unit 110, the transmission/reception driving unit 120 controls the DAC 130, the ADC 190, the raising frequency converter 140, the lowering frequency converter 180, a channel frequency generation unit 135, and the antenna switch 150. The transmission/reception driving unit 120, for example, may be implemented as a logic circuit in order for a fast processing speed.

The DAC 130 is connected to the transmission/reception driving unit 120, and receives split channel signals from the transmission/reception driving unit 120. The DAC 130 converts split channel signals from digital signals to analog signals.

The channel frequency generation unit 135 generates a channel frequency fi corresponding to each of a plurality of split channel signals according to a control of the transmission/reception driving unit 120. The channel frequency generation unit 135 provides the generated channel frequency fi to the raising frequency converter 140, and the lowering frequency converter 180.

The raising frequency converter 140 is connected to the DAC 130 and receives split channel signals from the DAC 130. The raising frequency converter 140 is connected to the channel frequency generation unit 135 and receives respective channel signals for a plurality of split channel signals from the channel frequency generation unit 135. The raising frequency converter 140 raises the frequencies of a plurality of split channel signals to different passbands in the baseband on the basis of a channel frequency.

The antenna switch 150 performs a switching operation when transmitting a split channel or receiving a split channel binding signal according to a control of the transmission/reception driving unit 120.

For example, the antenna switch 150 is connected between the raising frequency converter 140 and the transmission antenna 160. The antenna switch 150 selects at least one of a plurality of antennas in the transmission antenna 160 when transmitting split channel signals to a target object 10.

As another example, the antenna switch 150 is connected between the lowering frequency converter 180 and the reception antenna 170. The antenna switch 150 selects at least one of a plurality of antennas in the transmission antenna 170 when transmitting split channel signals to a target object 10.

The lowering frequency converter 180 is connected to the antenna switch 150 and receives a plurality of split channel reflection signals from the antenna switch 150. The lowering frequency converter 180 is connected to the channel frequency generation unit 135 and receives respective channel signals for a plurality of split channel signals from the channel frequency generation unit 135. The lowering frequency converter 180 lowers each different passband of a plurality of split channel reflection signals to the baseband on the basis of a channel frequency.

In this case, a channel frequency provided to the lowering frequency converter 180 and a channel frequency provided to the raising frequency converter 140 are the same by the channel frequency generation unit 135. Accordingly, the lowing frequency converter 180 and the raising frequency converter 140 are synchronized to each other and operate.

Moreover, the ADC 190 is connected to the lowering frequency converter 180 and receives split channel reflection signals from the lowering frequency converter 180. The ADC 190 converts the split channel reflection signals from analog signals to digital signals and transmits the digital signals to the transmission/reception driving unit 120.

As mentioned above, the radar device 100 according to an embodiment of the technical scope of the inventive concept supports a split channel radar method. That is, the radar device 100 divides an integrated band signal into a plurality of split channel signals and transmit them through an OFDM technique, and generates one integrated band response signal by binding the plurality of split channel reflection signals. By supporting a split channel radar method, the radar device 100 may scan the target object 10 at a high speed.

Figure 2A:
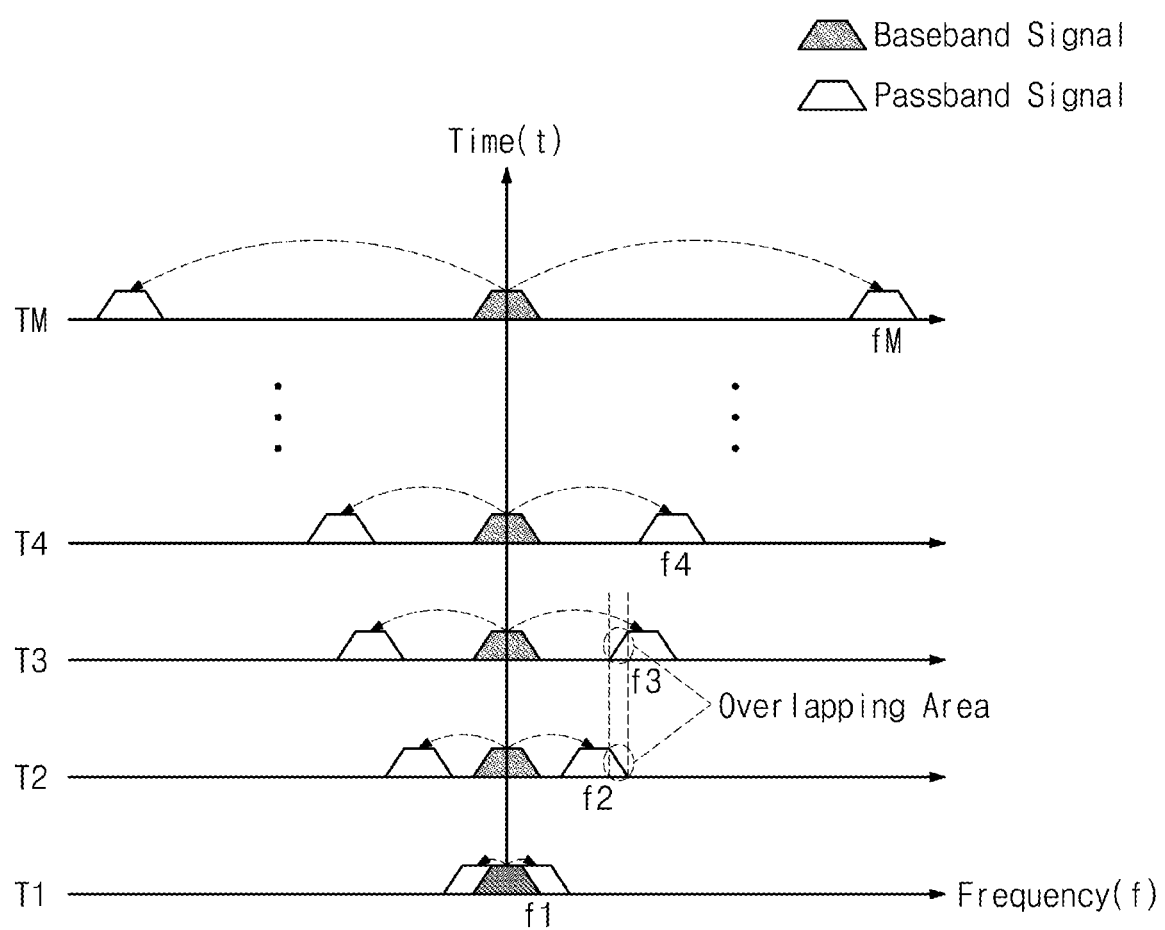
FIGS. 2A to 2D are views illustrating the transmission of a split channel signal, the reception of a split channel reflection signal, the generation of an integrated band response signal and the channel binding area through a radar device according to an embodiment of the inventive concept.
Figure 2B:
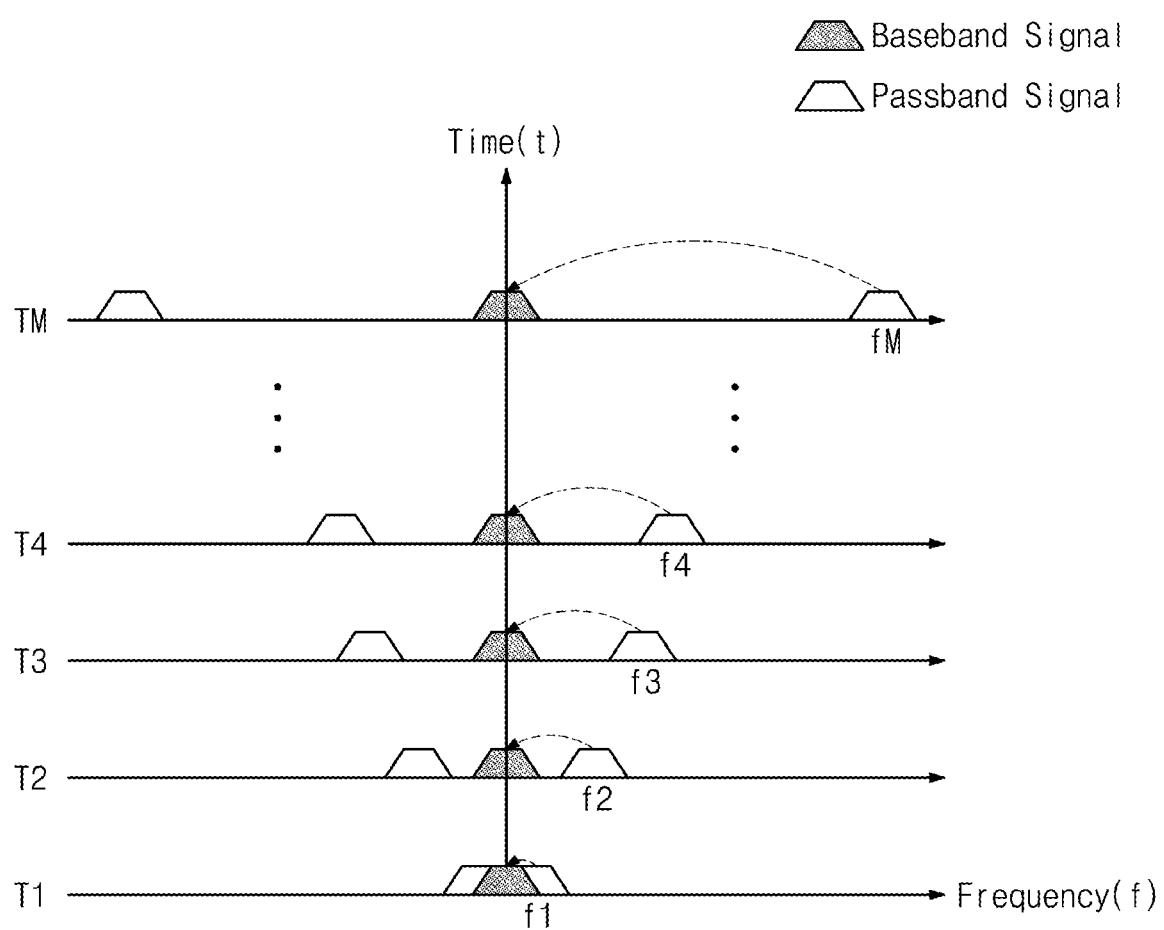
Figure 2C:
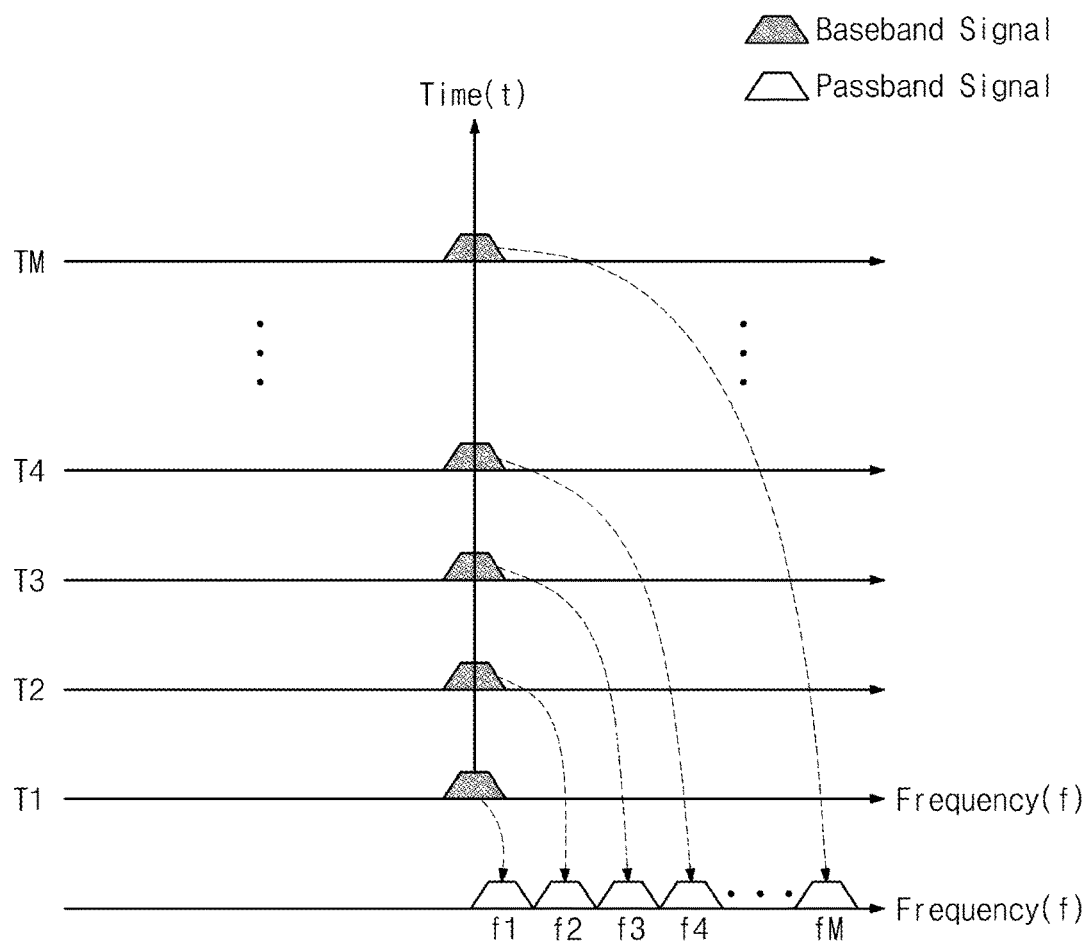

FIGS. 2A to 2C are views illustrating the transmission of a split channel signal, the reception of a split channel reflection signal, and the generation of an integrated band response signal through the radar device 100 according to an embodiment of the inventive concept.

FIG. 2 is a view illustrating a transmission process of a split channel signal of the radar device 100 of FIG. 1 according to an embodiment of the inventive concept.

Referring to FIG. 2A, the raising frequency converter 140 (see FIG. 1) generates a plurality of split channel signals having frequencies in different passbands by raising split channel signals in the baseband to respective channel frequencies f1, f2, f3, f4, . . . , and fM through M channels. The plurality of split channel signals in different passbands are transmitted to a target object.

For example, from a time T1 to a time T2, a split channel signal in a first baseband is raised to a channel using a first channel frequency f1 as a carrier wave in the baseband. Then, a first split channel signal using the first channel frequency f1 as a carrier wave is transmitted to a target object. In such a manner, split channel signals transmitted in each time area may have different passbands.

In an embodiment according to the technical scope of the inventive concept, a plurality of split channel signals may have each overlapping area. For example, referring to FIG. 2A, an area where split channel signals in a plurality of channels overlap is indicated by a dotted line. By setting the bands of signals in an adjacent channel to overlap each other as shown in FIG. 2A, a radar device according to an embodiment of the inventive concept may obtain an improved impulse response.

FIG. 2B is a view illustrating a reception process of a split channel reflection signal of the radar device 100 of FIG. 1 according to an embodiment of the inventive concept.

Referring to FIG. 2B, from a time T1 to a time T2, the reception antennal 170 (see FIG. 1) receives a split channel reflection signal in a passband having a carrier wave of the first channel frequency f1, and the lower frequency converter 180 (see FIG. 1) performs an operation for lowering the first channel frequency f1 to the baseband.

In the same manner, from a time T2 to a time T3, the reception antennal 170 receives a split channel reflection signal in a passband having a carrier wave of the second channel frequency f2, and the lower frequency converter 180 performs an operation for lowering the second channel frequency f2 to the baseband.

Lastly, from a time TM-1 to a time TM, the reception antennal 170 receives a split channel reflection signal in a passband having a carrier wave of the Mth channel frequency fM, and the lower frequency converter 180 performs an operation for lowering the Mth channel frequency fM to the baseband.

If all split channel reflection signals in the M channels are lowered to the baseband, the device control unit 110 (see FIG. 1) generates an integrated band response signal by using the split channel reflection signals.

Figure 2D:
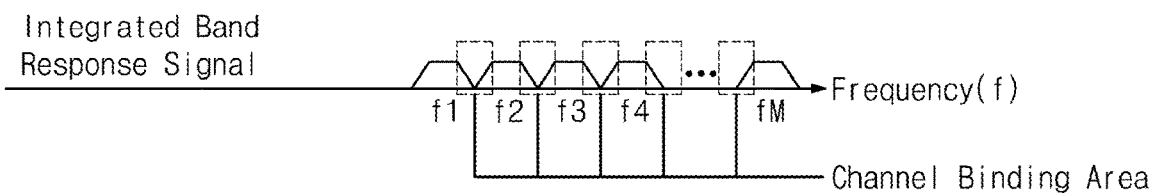

FIG. 2C is a view illustrating a process for configuring channel signals lowered to the baseband as an integrated band response signal and FIG. 2D is a view illustrating a channel binding area of an exemplary integrated band response signal.

Referring to FIG. 2C, channel signals lowered to the baseband are configured as an integrated response signal during different times. The operation of FIG. 2C, for example, may be performed by the device control unit 110.

Referring to FIG. 2D, in the case that the device control unit 110 generates an integrated band response signal, a channel binding area occurs between each of channels.

In the case that a radar signal is transmitted/received by using a plurality of split channels, only if the device control unit 110 supports functions such as channel boundary processing, discontinuous phase processing at the channel boundary, and/or the removal of a DC area component generated when it is lowered to the base band during a process for configuring a plurality of split channel reflection signals as an integrated band response signal, an improved response may be obtained like transmitting/receiving an impulse radar signal.

Accordingly, the radar device 100 according to the technical scope of the inventive concept supports at least one of a channel boundary processing function, a discontinuous phase processing function, and a DC component removing function and this will be described in more detail with reference to FIGS. 13 to 19.

Additionally, the radar device 100 may further improve the accuracy of an impulse response by supporting at least one of a calibration compensating function, an interference frequency interpolating function, and a frequency correcting function of an integrated band response signal. This will be also described in more detail with reference to FIGS. 13 to 19.

Figure 3:
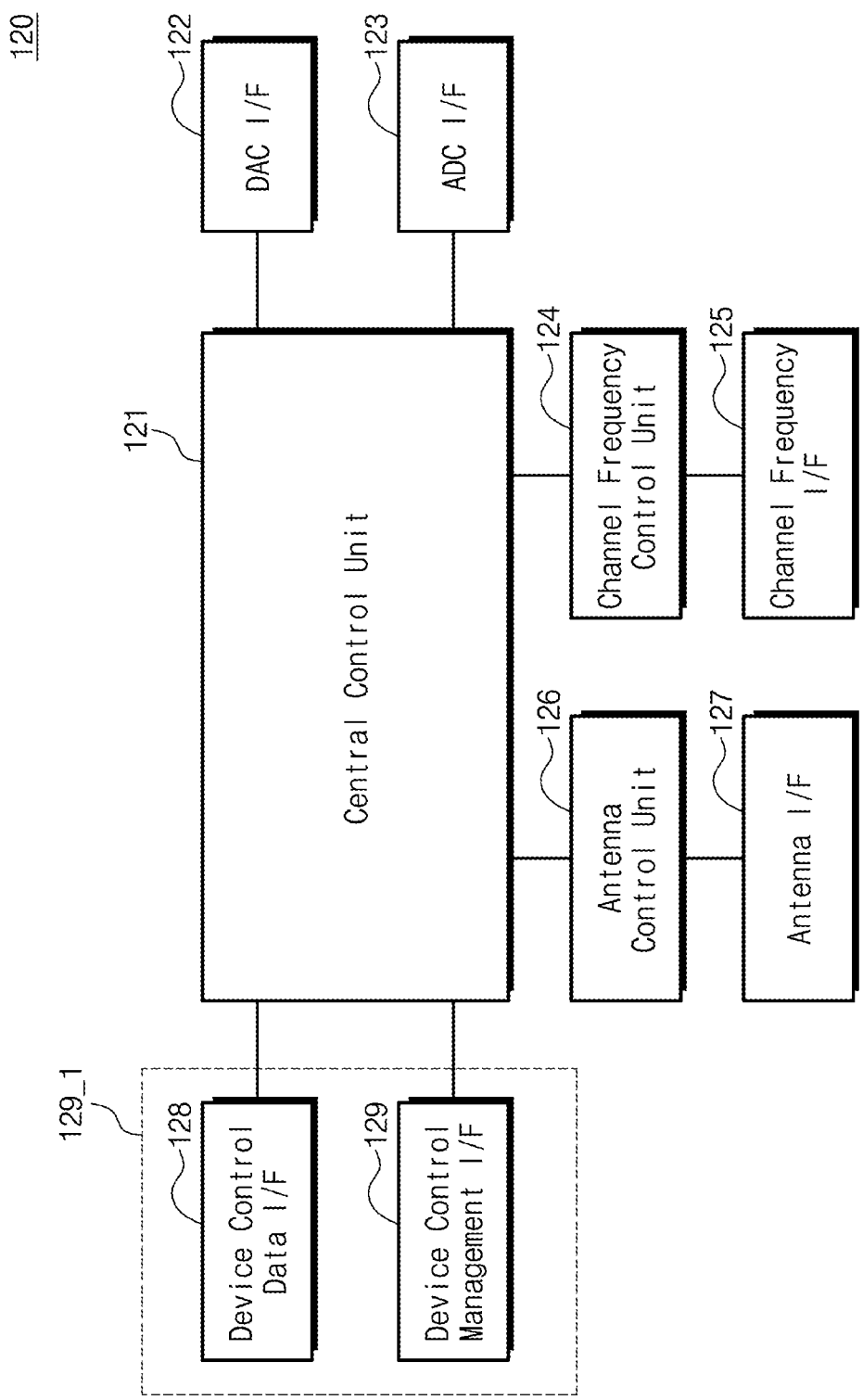
FIG. 3 is a block diagram illustrating a configuration of a transmission/reception driving unit of FIG. 1 according to an embodiment of the inventive concept.

FIG. 3 is a block diagram illustrating a configuration of the transmission/reception driving unit 120 of FIG. 1 according to an embodiment of the inventive concept.

Referring to FIG. 3, the transmission/reception driving unit 120 includes a central control unit 121, a digital to analog converter interface (hereinafter referred to as a DAC I/F) 122, an analog to digital converter interface (hereinafter referred to as an ADC I/F) 123, a frequency control unit 124, a frequency I/F 125, an antenna control unit 126, an antenna I/F 127, a device control data I/F 128, and a device control management I/F 129.

The central control unit 121 may transmit a split channel signal through the DAC I/F 122 or receive a split channel reflection signal through the ADC I/F 123. The central control unit 121 data-frames the received split channel reflection signal, and transmit it to the device control unit 110 through the device control data I/F 128.

A data type includes oversampled raw data and symbol data, and is determined according to which function the radar device 100 selects among a system initialization function, a gain control function, and a radar scan function.

Additionally, the central control unit 121 receives a setting instruction for each component of the radar device 100 from the device control unit 110 through the device control management I/F 129.

For example, according to a selected operating mode or a selected function, the central control unit 121 may receive from the device control unit 110 a setting instruction for the channel frequency generation unit 135, the DAC 130, the raising frequency converter 140, the antenna switch 150, the lowering frequency converter 180, and the ADC 190. In this case, the central control unit 121 may control them according to a received setting instruction through an interface corresponding to each component of the radar device 100.

The channel frequency control unit 124 controls operations of the channel frequency generation unit 135, the raising frequency converter 140, and the lowering frequency converter 180 according to an instruction of the central control unit 121 through the channel frequency I/F 125.

For example, the channel frequency control unit 124 may set an amplifier gain value of the raising frequency converter 140 and the lowering frequency converter 180 according to an instruction of the central control unit 121.

As another example, the channel frequency control unit 124 may perform a control on the channel frequency generation unit 135 in order to generate channel frequencies used for transmitting a split channel signal or receiving a split channel reflection signal according to an instruction of the central control unit 121.

The antenna control unit 126 may perform a control on the antenna switch 150 in order to switch the transmission antenna 160 or the reception antenna 170, which is used for transmitting a split channel signal or receiving a split channel reflection signal, according to an instruction of the central control unit 121.

The DAC I/F 122, the ADC I/F 123, the channel frequency I/F 125, the antenna I/F 127, the device control data I/F 128, and the device control management I/F 129 are provided in order for the connection with a corresponding component.

Moreover, although it is shown in FIG. 3 that the device control data I/F 128 and the device control management I/F 129 are implemented as separate hardware, this is exemplary and the technical scope of the inventive concept is not limited thereto. For example, the device control data I/F 128 and the device control management I/F 129 may be implemented as one hardware such as the device control I/F 129_1.

Figure 4:
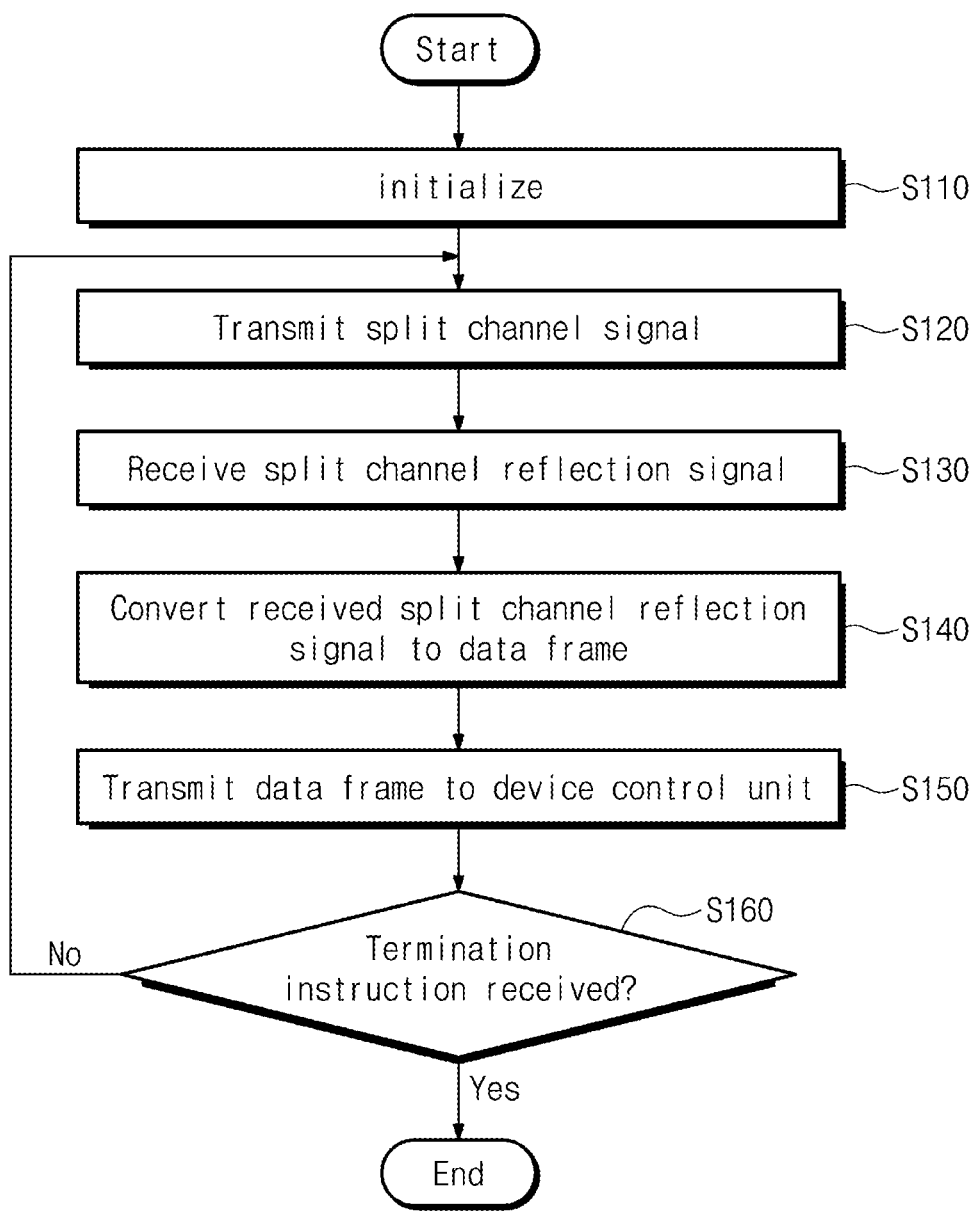
FIG. 4 is a flowchart illustrating an operation of a transmission/reception driving unit of FIG. 3.

FIG. 4 is a flowchart illustrating an operation of the transmission/reception driving unit 120 of FIG. 3.

In operation S110, in response to an instruction of the device control unit 110, an initialization operation for the transmission/reception driving unit 120 is performed.

In operation S120, a split channel signal is transmitted through the DAC I/F 122. In this case, in order to transmit a split channel signal, the central control unit 121 may control the channel frequency generation unit 135, the DAC 130, and the raising frequency converter 140.

In operation S130, a split channel reflection signal is received through the ADC I/F 123. In this case, in order to receive a split channel reflection signal, the central control unit 121 may control the channel frequency generation unit 135, the ADC 190, and the lowering frequency converter 180.

In operation S140, the central control unit 121 data-frames the received split channel reflection signal.

In operation S150, the central control unit 121 transmits the data-framed split channel reflection signal to the device control unit 110 through the device control data I/F 128.

In operation S160, the central control unit 121 determines whether a transmission/reception driving unit operation termination instruction is received from the device control unit 110. If the termination instruction is not performed, the central control unit 121 may perform a control on each component of the radar device 100 in order to perform operation S110 to operation S150 repeatedly.

Figure 5:
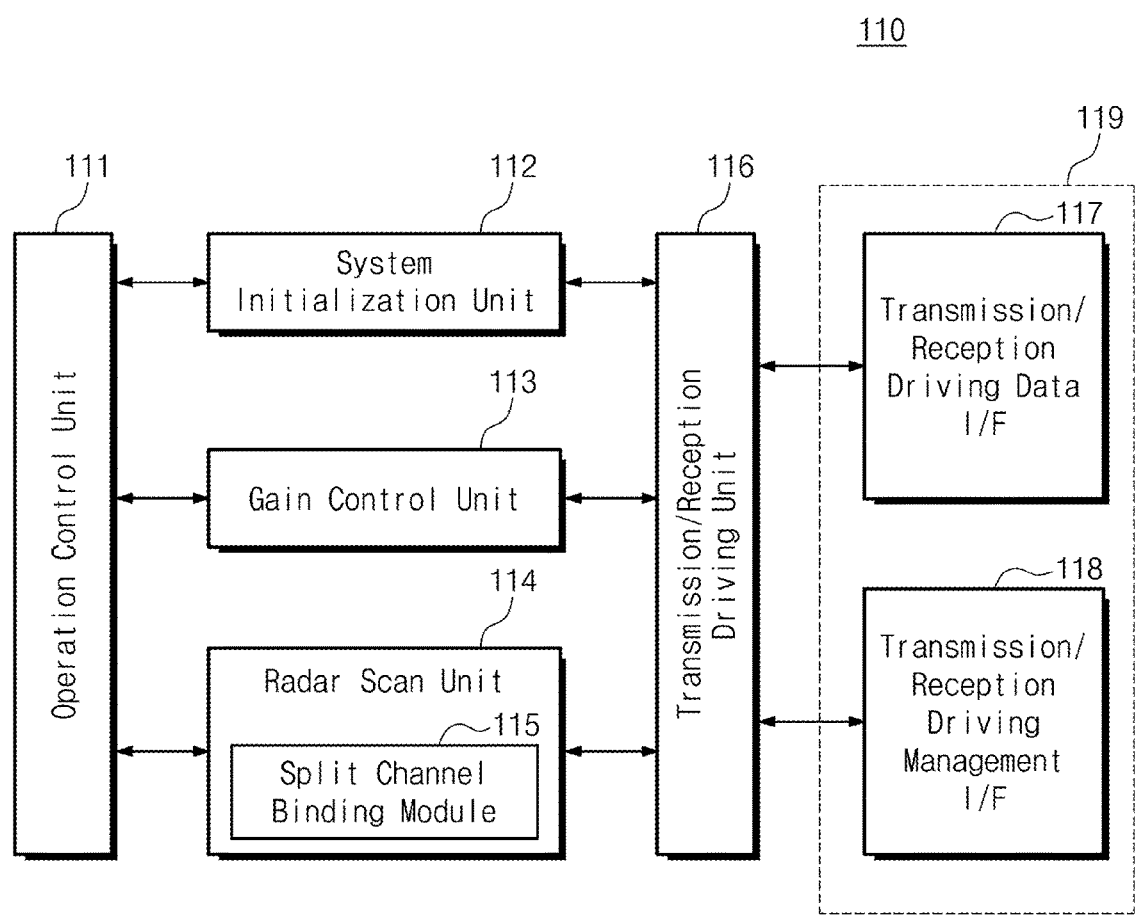
FIG. 5 is a block diagram illustrating a configuration of a device control unit of FIG. 1 according to an embodiment of the inventive concept.

FIG. 5 is a block diagram illustrating a configuration of the device control unit 110 of FIG. 1 according to an embodiment of the inventive concept.

Referring to FIG. 5, the device control unit 110 includes an operation control unit 111, a system initialization unit 112, a gain control unit 113, a radar scan unit 114, a transmission/reception driving control unit 116, a transmission/reception driving data I/F 117, and a transmission/reception driving management I/F 118.

The operation control unit 111 manages a variable according to an operating mode and controls operations of the system initialization unit 112, the gain control unit 113, and the radar scan unit 114. The operating mode includes a calibration mode, an interference recognition mode, and a continuous scan mode.

The calibration mode means an operation for measuring the frequency characteristics of a component necessary for transmitting a split channel signal or receiving a split channel reflection signal, for example, the transmission/reception driving unit 120, the DAC 130, the ADC 190, the raising frequency converter 140, the lowering frequency converter 180, the channel frequency generation unit 135, and the antenna switch 150 of the split channel radar device 100, and an interface for connecting them.

The interference recognition mode means an operation for recognizing an external radio signal in a frequency area, which is received from the reception antenna 170, when not transmitting a split channel signal.

The continuous scan mode means a radar signal transmission/reception operation of the radar device 100, that is, an operation for transmitting a signal to a target object through the transmission of a split channel signal and the reception of a split channel reflection signal, and collecting and displaying a reflection signal for it.

The system initialization unit 112 performs a system initialization function for initializing a state of the transmission/reception driving unit 120 according to an instruction of the operation control unit 111. An operation of the system initialization unit 112 will be described in more detail with reference to FIG. 7.

The gain control unit 113 performs a gain control function for setting an amplifier gain value of the raising frequency converter 140 and the lowering frequency converter 180 according to an instruction of the operation control unit 111. A configuration and an operation of the gain control unit 113 will be described in more detail with reference to FIGS. 8 to 10.

The radar scan unit 114 transmits a split channel signal to a target object according to an instruction of the operation control unit 111 and collects a split channel reflection signal, that is, a reflection signal for it, to perform a radar scan function for generating an integrated band response signal.

The radar scan unit 114 includes a split channel binding module 115 and the split channel binding module 115 bonds a plurality of split channel reflection signals to perform a split channel binding function for generating an integrated band response signal. A configuration and an operation of the radar scan unit 114 and the split channel binding module 115 will be described in more detail with reference to FIGS. 11 to 14.

Referring to FIG. 5 continuously, the transmission/reception driving control unit 116 is connected to the transmission/reception driving unit 120 through the transmission/reception driving data I/F 117 and the transmission/reception driving management I/F 118 and performs a function for controlling the transmission/reception driving unit 120.

Figure 6:
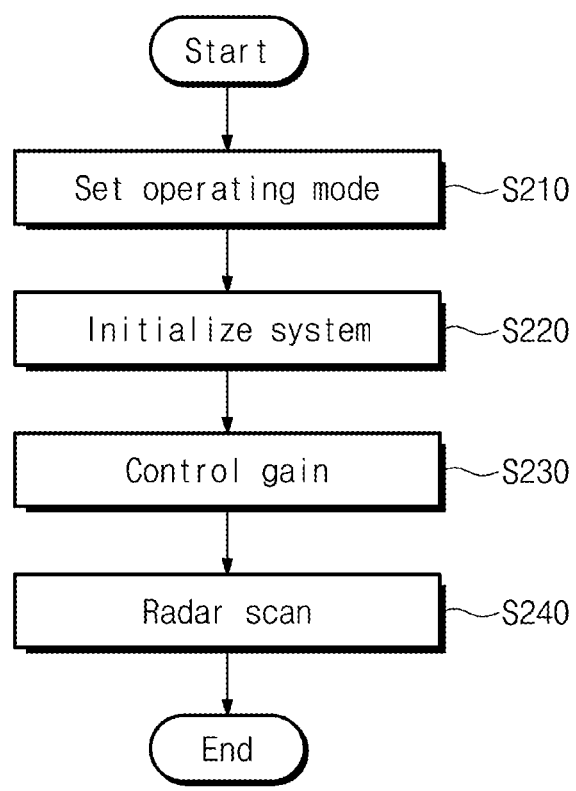
FIG. 6 is a flowchart illustrating an operation management by an operation control unit of FIG. 5 according to an embodiment of the inventive concept.

FIG. 6 is a flowchart illustrating an operation management by the operation control unit 111 of FIG. 5 according to an embodiment of the inventive concept.

In operation S210, an operating mode is set first. The operating mode, for example, may be selected from a calibration mode, an interference recognition mode, and a continuous scan mode.

In operation S220, the system initialization unit 112 performs a system initialization function for initializing a system.

In operation S230, the gain control unit 113 performs a gain control function for setting an amplifier gain value of the raising frequency converter 140 and the lowering frequency converter 180.

In operation S240, the radar scan unit 114 transmits a split channel signal to a target object and collects a split channel reflection signal, that is, a reflection signal for it, to perform a radar scan function for generating an integrated band response signal.

Figure 7:
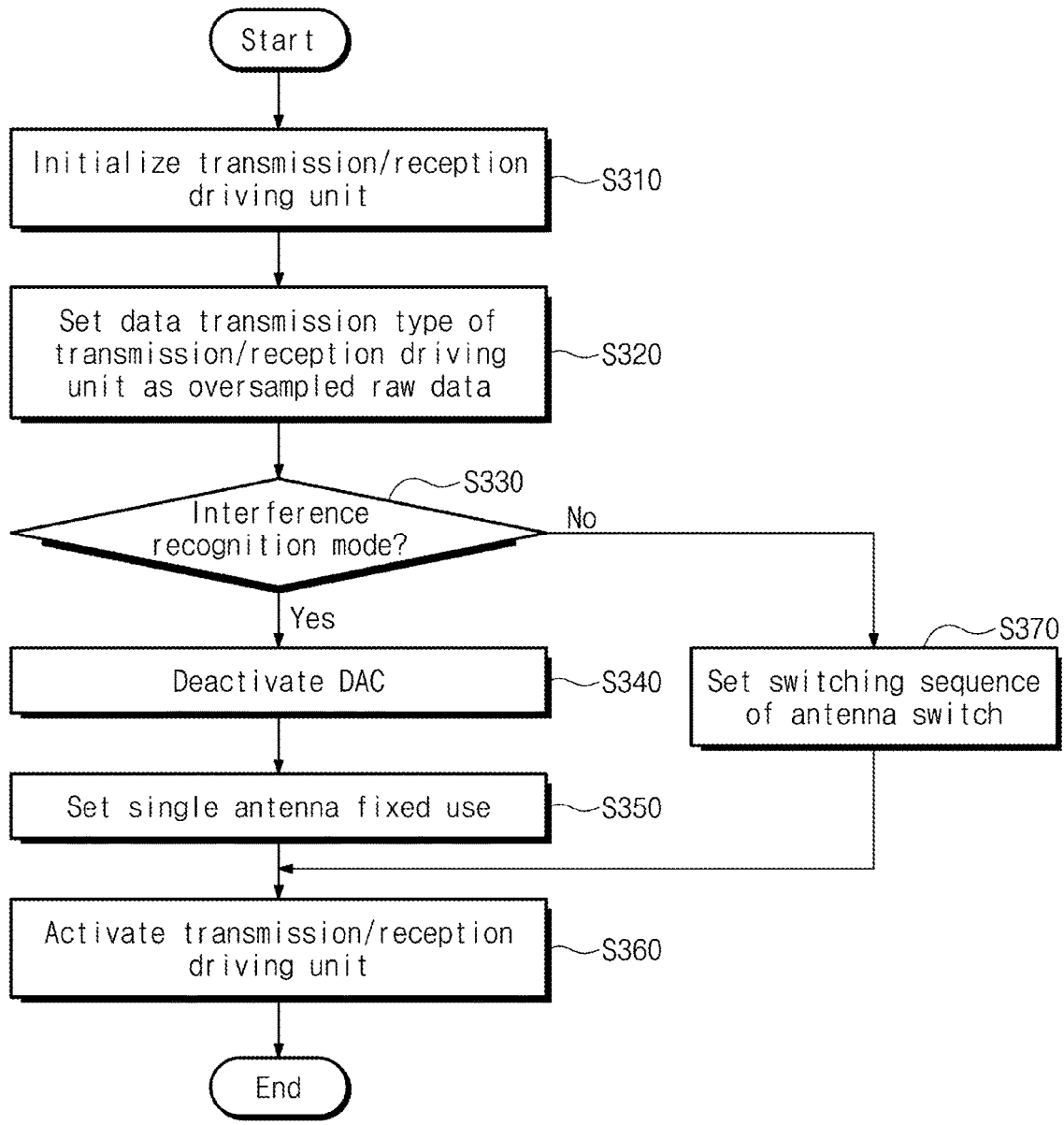
FIG. 7 is a flowchart illustrating a system initialization function of a system initialization unit of FIG. 5.

FIG. 7 is a flowchart illustrating a system initialization function of the system initialization unit 112 of FIG. 5.

In operation S310, the transmission/reception driving unit 120 (see FIG. 1) is initialized first. In more detail, once a system initialization function starts, the system initialization unit 112 connects the device control unit 110 and the transmission/reception driving unit 120 through the transmission/reception driving control unit 116 and initializes the transmission/reception driving unit 120.

In operation S320, according to a control of the operation control unit 111, the system initialization unit 112 sets a data type transmitted through the transmission/reception driving data I/F 117 as oversampled raw data.

In operation S330, the system initialization unit 112 determines whether an operating mode is an interference recognition mode.

If the operating mode is the interference recognition mode, in order not to transmit a split channel signal, the DAC 122 (see FIG. 1) is deactivated in operation S340 and a switching sequence of the antenna switch 150 (see FIG. 1) is set to fix a single transmission/reception antenna in operation S350.

If the operating mode is not the interference recognition mode, that is, the operating mode is a calibration mode or a continuous scan mode, a switching sequence of the antenna switch 150 is set in order to transmit a split channel signal in operation S370.

Then, in operation S360, the system initialization unit 112 activates an operation of a transmission/reception driving unit and terminates a system initialization function.

Figure 8:
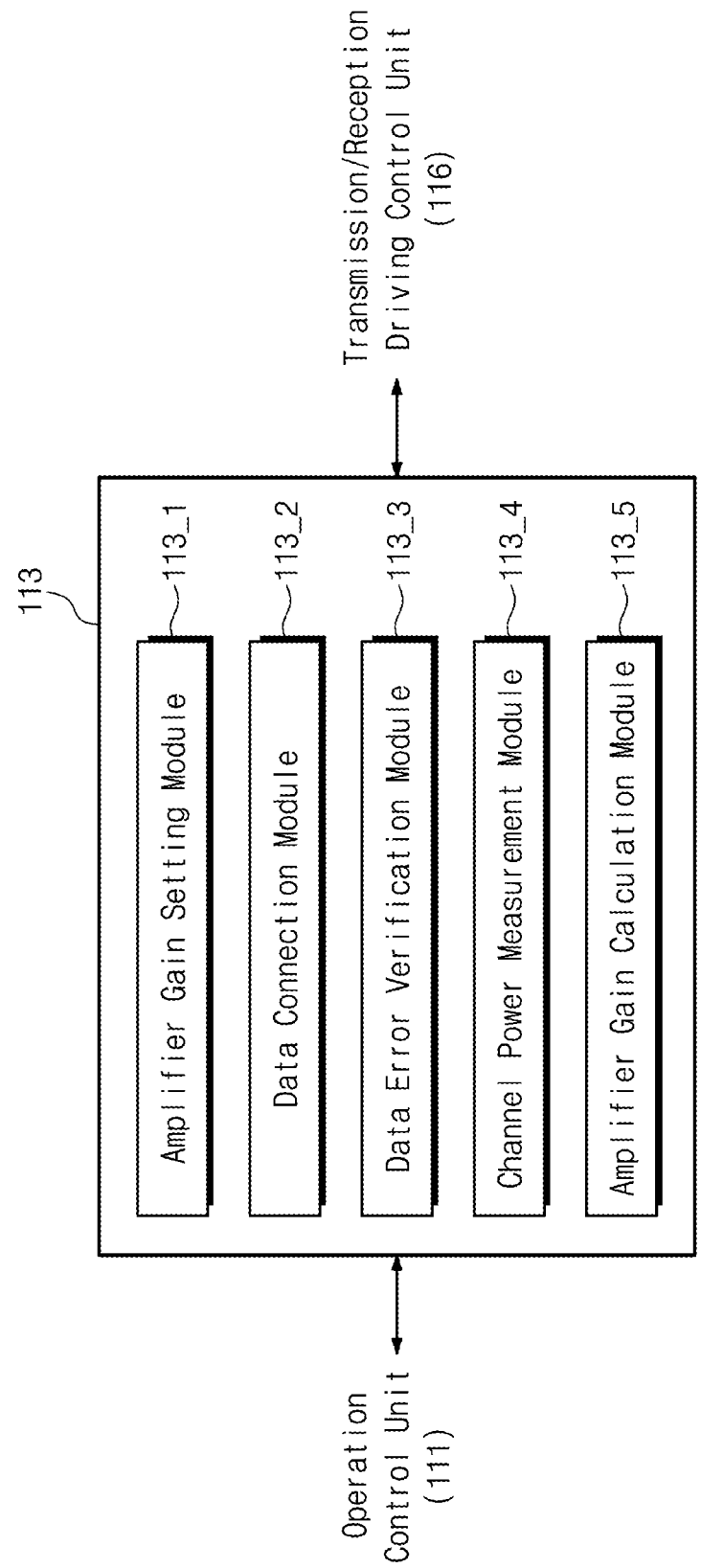
FIG. 8 is a block diagram illustrating a configuration of a gain control unit of FIG. 5 according to an embodiment of the inventive concept.

FIG. 8 is a block diagram illustrating a configuration of the gain control unit of FIG. 5 according to an embodiment of the inventive concept. Referring to FIG. 8, the gain control unit 113 includes an amplifier gain setting module 113_1, a data connection module 113_2, a data error verification module 113_3, a channel power measurement module 113_4, and an amplifier gain calculation module 113_5.

The amplifier gain setting module 113_1 sets an amplifier gain of the raising frequency converter 140 (see FIG. 1) and the lowering frequency converter 180 (see FIG. 1) as an intermediate value or a minimum value according to an operating mode when a gain control function starts.

For example, when an operating mode is an interference recognition mode, the amplifier gain setting module 113_1 sets an amplifier gain of the raising frequency converter 140 and the lowering frequency converter 180 as an intermediate value when a gain control starts. Herein, the intermediate value, for example, may be an arbitrary value within a gain range allowed according to the device characteristics of the raising frequency converter 140 and the lowering frequency converter 180.

As another example, when the operating mode is a calibration mode or a continuous scan mode, the amplifier gain setting module 113_1 sets an amplifier gain of the raising frequency converter 140 and the lowering frequency converter 180 as a minimum value when a gain control starts. Herein, the minimum value, for example, may be a minimum value or a value close thereto within a gain range allowed according to the device characteristics of the raising frequency converter 140 and the lowering frequency converter 180.

Additionally, the amplifier gain setting module 113_1 may set an amplifier gain value, which is calculated by the amplifier gain calculation module 113_5, as an amplifier gain of the raising frequency converter 140 and the lowering frequency converter 180 after performing a gain control function.

The data collection module 113_2 collects a data-framed split channel reflection signal received from the transmission/reception driving unit 120 and stores it temporarily.

The data error verification module 113_3 verifies whether there is an error in the collected split channel reflection signal and if there is an error, performs a control on the transmission/reception driving unit 120 in order to receive a split channel reflection signal again.

The channel power measurement module 113_4 measures each channel specific power of the split channel reflection signals.

The amplifier gain calculation module 113_5 calculates an amplifier gain of the raising frequency converter 140 and the lowering frequency converter 180 on the basis of each measured channel specific power.

Figure 9:
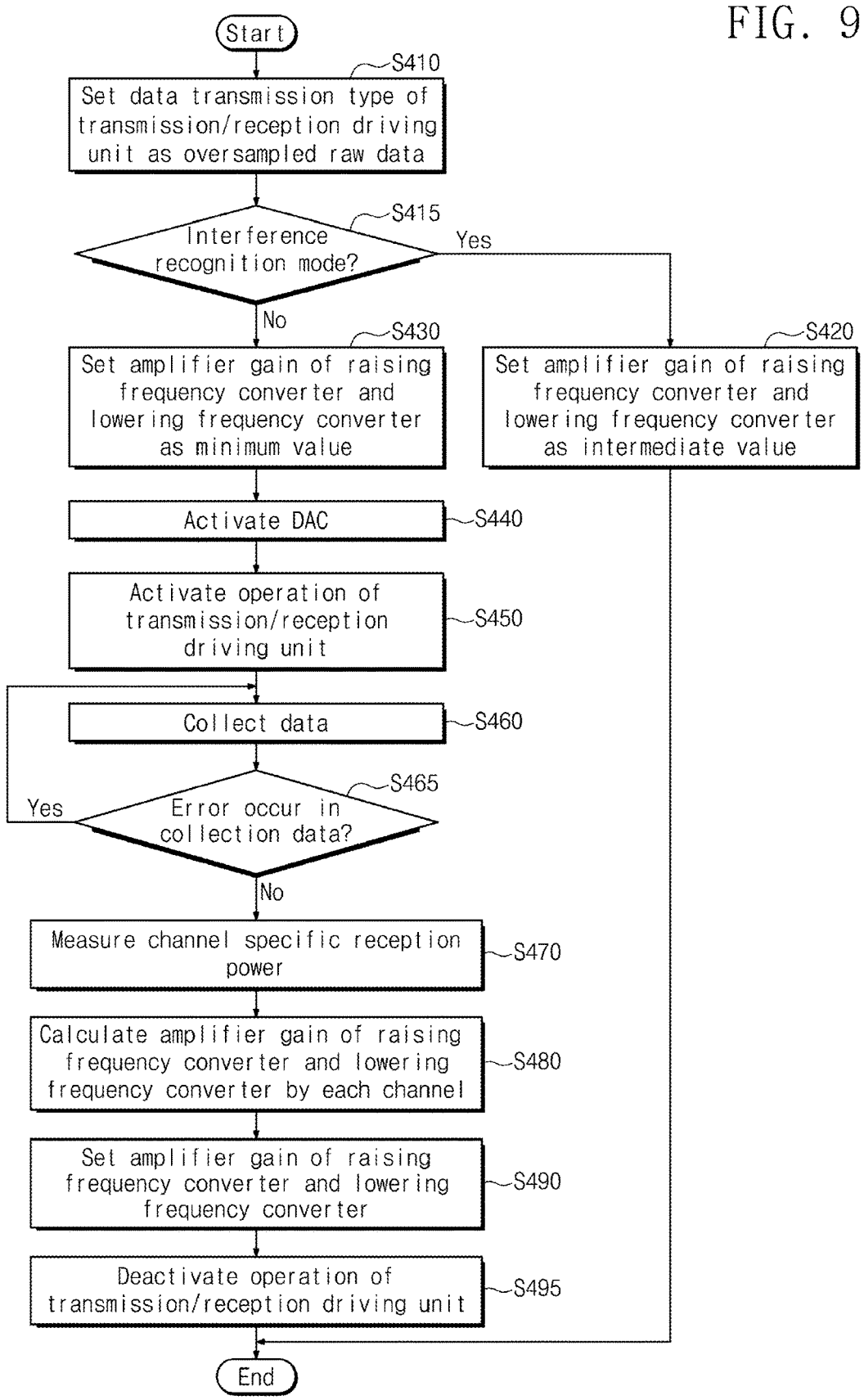
FIG. 9 is a flowchart illustrating a gain control function performed by a gain control unit of FIG. 8 according to an embodiment of the inventive concept.

FIG. 9 is a flowchart illustrating a gain control function performed by the gain control unit 113 of FIG. 8 according to an embodiment of the inventive concept.

In operation S410, a data transmission type of the transmission/reception driving unit 120 is set as oversampled raw data.

In operation S420, it is determined whether an operating mode is an interference recognition mode.

If the operating mode is the interference recognition mode, it is unnecessary that the gain control unit 113 controls an amplifier gain for a split channel signal. Accordingly, in this case, the amplifier gain setting module 113_1 sets an amplifier gain value of the raising frequency converter 140 and the lowering frequency converter 180 as an intermediate value in operation S430 and terminates the gain control function.

If the operating mode is not the interference recognition mode, an optimal amplifier gain should be set according to the received split channel reflection signal. Accordingly, in this case, operations below for setting an optimal amplifier gain of the raising frequency converter 140 and the lowering frequency converter 180 are performed.

First, in operation S430, the amplifier gain setting module 113_1 sets an amplifier gain of the raising frequency converter 140 and the lowering frequency converter 180 as a minimum value.

In operation S440, a DAC is activated.

In operation S450, an operation of the transmission/reception driving unit 120 is activated.

In operation S460, the data collection module 113_2 collects a split channel reflection signal transmitted from the transmission/reception driving unit 120 and stores it.

In operation S465, the data error verification module 113_3 determines whether there is an error in the collected split channel reflection signal and if there is an error, performs a control on the transmission/reception driving unit 120 in order to collect data again.

If there is no error, in operation S470, the channel power measurement module 113_4 measures a channel specific reception power.

In operation S480, the amplifier gain calculation module 113_5 calculates an amplifier gain value for each channel of the raising frequency converter 140 and the lowering frequency converter 180 by using the measured reception power value.

In operation S490, the amplifier gain setting module 113_1 sets a gain value of the raising frequency converter 140 and the lowering frequency converter 180 by using each calculated channel specific amplifier gain value.

In operation S495, the gain control unit 113 deactivates an operation of the transmission/reception driving unit 120 and terminates the gain control function.

Figure 10:
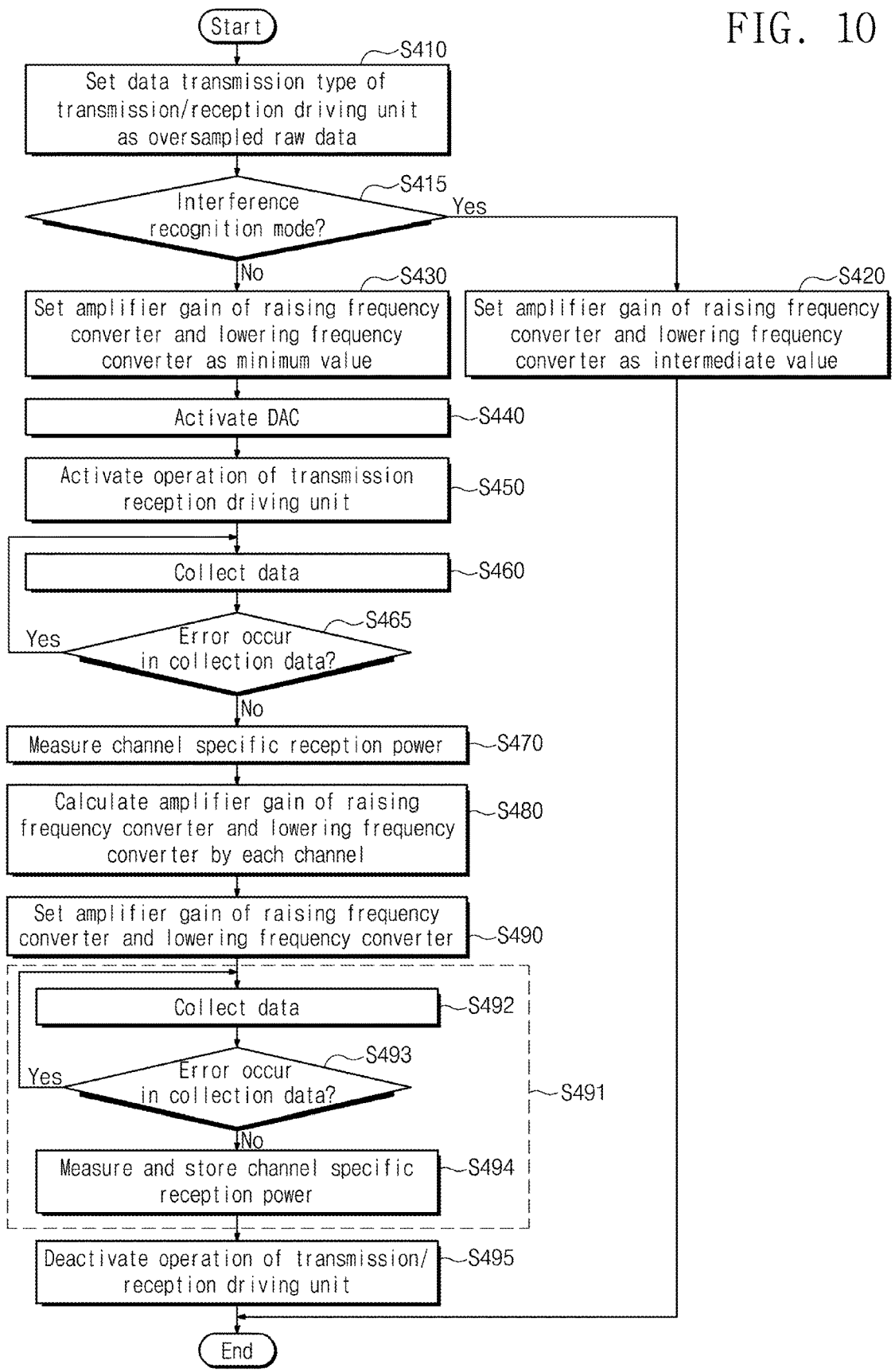
FIG. 10 is a flowchart illustrating a gain control function performed by a gain control unit of FIG. 8 according to another embodiment of the inventive concept.

FIG. 10 is a flowchart illustrating a gain control function performed by the gain control unit 113 of FIG. 8 according to another embodiment of the inventive concept. The performing operation of the gain control function of FIG. 10 is similar to the performing operation of the gain control function of FIG. 9. Accordingly, similar operations are displayed using similar reference numerals and for concise description, similar contents are omitted below.

Unlike FIG. 9, the gain control function of FIG. 10 calculates an amplifier gain value by the amplifier gain calculation module 113_5, and after setting the amplifier gain value as an amplifier gain of the raising frequency converter 140 and the lowering frequency converter 180, further includes an operation for verifying whether an error occurs again in operation S491.

In more detail, after setting the amplifier gain value as an amplifier gain of the raising frequency converter 140 and the lowering frequency converter 180, the data collection module 113_2 receives again a split channel reflection signal from the transmission/reception driving unit 120 and stores it in operation S492.

Then, the data error verification module 113_3 determines whether there is an error in the collected split channel reflection signal and if there is an error, performs a control on the transmission/reception driving unit 120 in order to collect data again in operation S493.

If there is no error, the channel power measurement module 113_4 measures a channel specific reception power and stores it in operation S494.

Then, the operation of the transmission/reception driving unit is deactivated and the gain control function is terminated in operation S495.

Figure 11:
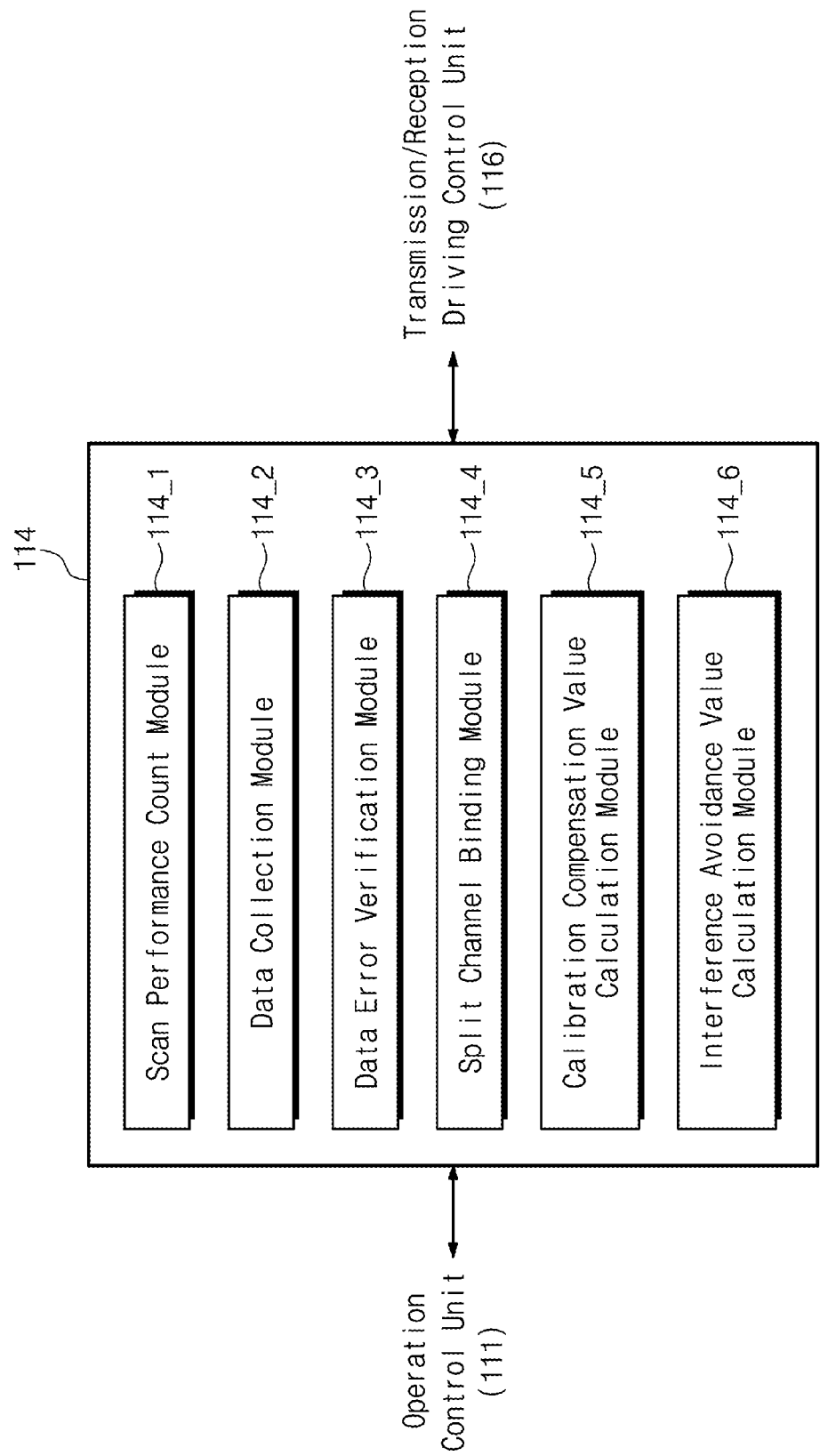
FIG. 11 is a block diagram illustrating a configuration of a radar scan unit of FIG. 5 according to an embodiment of the inventive concept.

FIG. 11 is a block diagram illustrating a configuration of the radar scan unit 114 of FIG. 5 according to an embodiment of the inventive concept.

The radar scan unit 114 transmits a split channel signal to a target object and collects a split channel reflection signal reflected therefrom to perform a radar scan function for generating an integrated band response signal.

Referring to FIG. 11, the radar scan unit 114 includes a scan performance count module 114_1, a data collection module 114_2, a data error verification module 114_3, a split channel binding module 114_4, a calibration compensation value calculation module 114_5, and an interference avoidance value calculation module 114_6.

The scan performance count module 114_1 counts the number of scan performances when a radar scan operation is performed. For example, when an operating mode is a calibration mode or an interference recognition mode, the scan performance count module 114_1 sets the number of target scan performances to M and sets a scan performance count to 0. In this case, each time one integrated band response signal is generated, the scan performance count module 114_1 increases a scan performance count by 1.

The data collection module 114_2 collects a data-framed split channel reflection signal received from the transmission/reception driving unit 120 and stores it temporarily.

The data error verification module 114_3 verifies whether there is an error in the collected split channel reflection signal and if there is an error, performs a control on the transmission/reception driving unit 120 in order to receive a split channel reflection signal again.

The split channel binding module 114_4 binds a plurality of split channel reflection signals to generate an integrated band response signal.

The calibration compensation value calculation module 114_5 calculates a calibration compensation value by using a binding result of split channel signals when a calibration mode is performed. A calibration compensation value calculating method is as follows.

There is a channel signal $H_{est}(k,i)$ generated by split channel binding signal processing. k represents a split channel number and i represents a scan performance count. A calibration compensation value $H_{comp}(k,i)$ is obtained by the following Equation 1.

$$H_{comp}(k,i) = |H_{est}(k,i)|^{-1} \exp[j \cdot \theta(k,i)] \qquad \text{[Equation 1]}$$

In Equation 1,. :$|H_{est}(k,i)|^{-1}$ is an estimation size compensation value and an estimation phase compensation value $\theta(k,i)$ is obtained by the following Equation 2.

$$\theta(k, i) = \arg\left[\frac{H_{est}^*(k, i)}{|H_{est}(k, i)|^2 + \mu \cdot \sigma^2(k, i)}\right] \qquad \text{[Equation 2]}$$

$\sigma(k,i)$. in Equation 2 is identical to that of Equation 3.

$$\sigma(k, i) = \frac{\left(H_{noise}(k, i) - \frac{\sum_{i=0}^{M-1} H_{noise}(k, i)}{M}\right)^2}{M - 1} \qquad \text{[Equation 3]}$$

$H_{noise}(k,i)$. in Equation 3 is identical to that of Equation 4.

$$H_{noise}(k, i) = H_{est}(k, i) - \frac{\sum_{i=0}^{M-1} H_{est}(k, i)}{M} \qquad \text{[Equation 4]}$$

As shown in Equation 1, the size of the calibration compensation value $H_{comp}(k,i)$. follows the Zero-Forcing (ZF) compensation principle of a channel signal $H_{est}(k,i)$ and a phase of $H_{comp}(k,i)$ follows the Minimum Mean Square (MMS) compensation principle of the channel signal $H_{est}(k,i)$. That is, the calibration compensation value has a ZF and MMS combined format.

Referring to FIG. 11 continuously, the interference avoidance value calculation module 114_6 calculates an interference avoidance value by using a binding result of split channel reflection signals in an interference recognition mode.

The interference avoidance value calculation module 114_6, for example, may calculate an interference avoidance value as operating in a state that the transmission antenna 160 is set to OFF, receiving an interference signal in a split band, estimating a spectrum in each split band by using the received interference signal, generating an interference signal display table by using the estimated spectrum, removing a frequency section including an interference signal from the generated interference signal display table, and generating an interpolation value by using a peripheral value of the removed frequency section in order to calculate.

Figure 12:
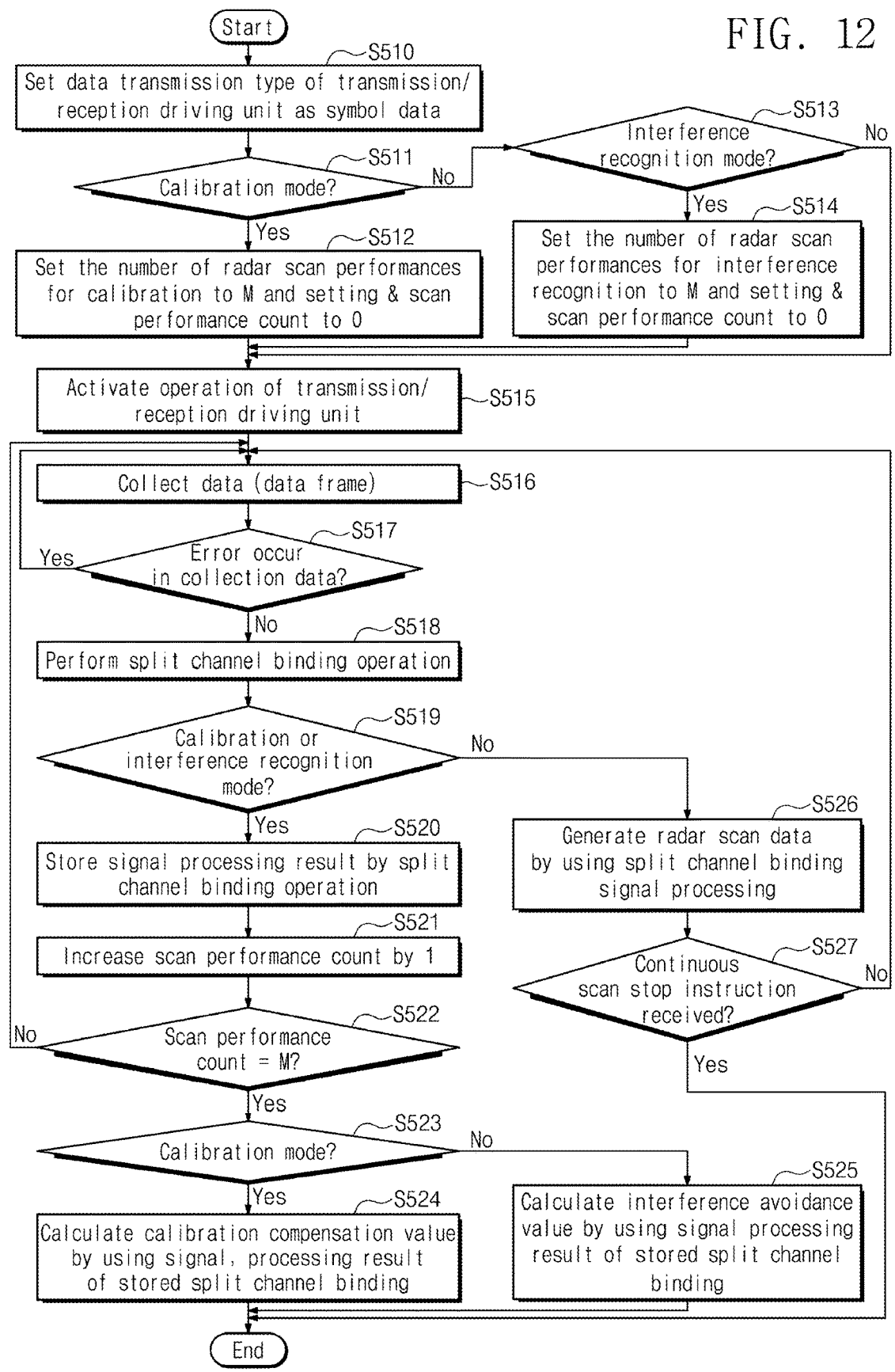
FIG. 12 is a flowchart illustrating a radar scan function performed by a radar scan unit of FIG. 11 according to an embodiment of the inventive concept.

FIG. 12 is a flowchart illustrating a radar scan function performed by the radar scan unit 114 of FIG. 11 according to an embodiment of the inventive concept.

In operation S510, once radar scan starts, a data type transmitted through the transmission/reception driving unit 120 is set as symbol data.

In operation S511, it is determined whether an operating mode is a calibration mode.

If the operating mode is the calibration mode, in operation S512, the scan performance count module 114_1 sets the number of target radar scan performances for a calibration function to M and sets a scan performance count to 0.

If the operating mode is not the calibration mode, in operation S513, it is determined whether the operating mode is an interference recognition mode. If the operating mode is the interference recognition mode, in operation S514, the scan performance count module 114_1 sets the number of target radar scan performances for an interference recognition function to M and sets a scan performance count to 0.

Moreover, in operation S511 and operation S513, if it is determined that the operating mode is not the calibration mode and the interference recognition mode (that is, the operating mode is a continuous scan mode), the number of additional target radar scan performances may not be set.

Then in operation S515, an operation of the transmission/reception driving unit 120 is activated.

In operation S516, the data collection module 114_2 receives a split channel reflection signal and stores it.

In operation S517, the data error verification module 114_3 determines whether there is an error in the received split channel reflection signal.

If it is determined that there is an error in the received split channel reflection signal, the data error verification module 114_3 performs a control on the transmission/reception driving unit 120 in order to receive a split channel reflection signal again.

If there is no error in the received split channel reflection signal, in operation S518, the split channel binding module 114_4 performs an operation for binding the split channel reflection signals to generate an integrated band response signal.

In operation S519, it is determined whether the operating mode is one of a calibration mode or an interference recognition mode.

If it is determined in operation S519 that the operating mode is not a calibration mode or an interference recognition mode (that is, the operating mode is a continuous scan mode), in operation S525, an operation for generating and displaying A/B scan data is performed by using a split channel binding signal processing result. In this case, as long as a user does not stop continuous scan, a radar scan operation is performed continuously in operation S527.

If it s determined in operation S519 that the operating mode is one of a calibration mode or an interference recognition mode, in operation S520, the split channel binding module 114_4 stores a split channel binding result. Then, in operation S521, the scan performance count module 114_1 increases a scan performance count by 1. Then, in operation S522, it is determined whether a scan performance count is M and if the scan performance count is M, an operation for calculating a calibration compensation value or an interference avoidance value is performed.

In more detail, in operation S523, it is determined whether the operating mode is a calibration mode. If the operating mode is a calibration mode, in operation S524, the calibration compensation value calculation module 114_5 calculates a calibration compensation value by using a signal processing result of stored split channel binding. If the operating mode is not the calibration mode (that is, the operating mode is an interference recognition mode), in operation S525, the interference avoidance value calculation module 114_6 calculates an interference avoidance value by using a signal processing result of stored split channel binding.

Figure 13:
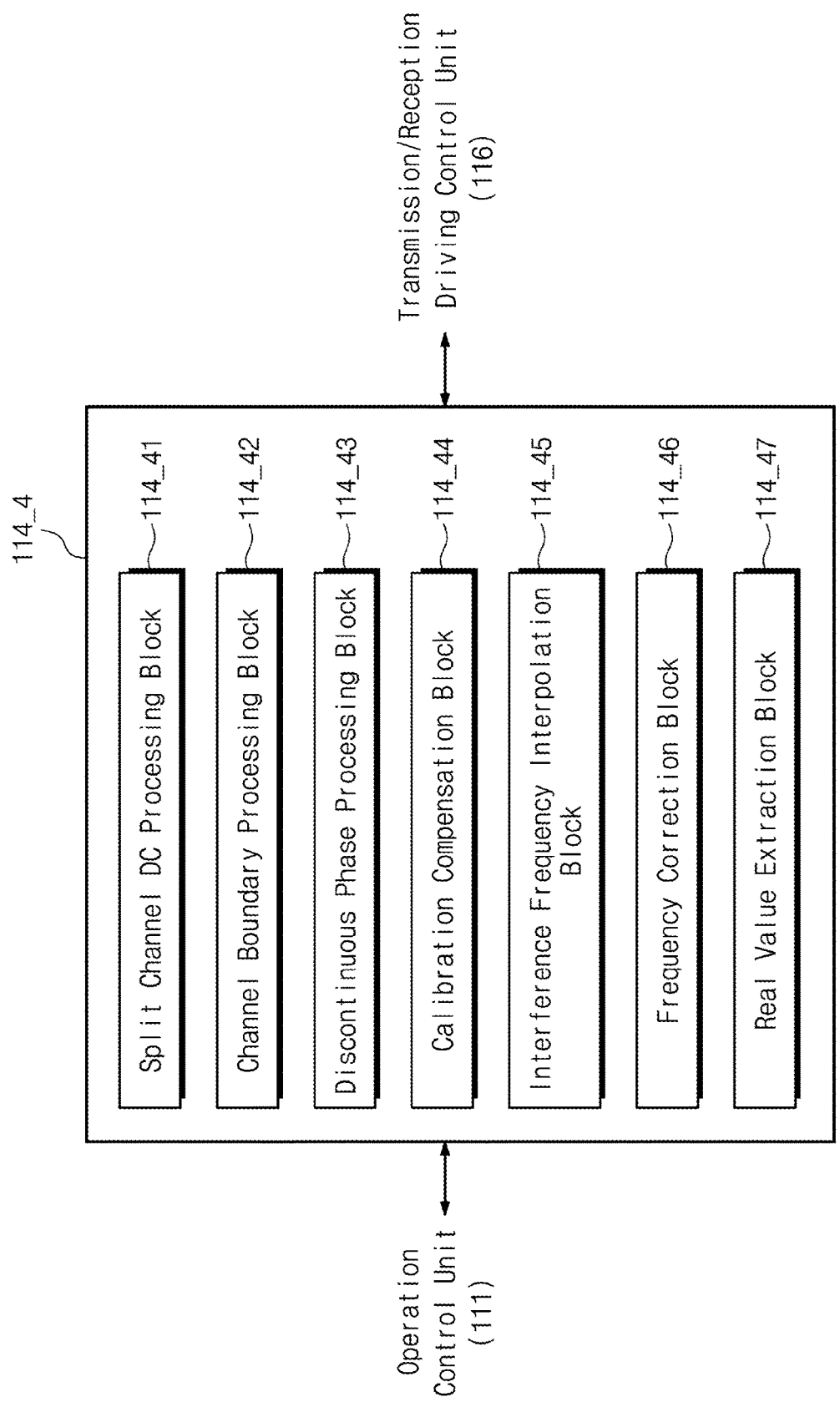
FIG. 13 is a block diagram illustrating a configuration of a split channel binding module of FIG. 11 according to an embodiment of the inventive concept.

FIG. 13 is a block diagram illustrating a configuration of the split channel binding module 114_4 of FIG. 11 according to an embodiment of the inventive concept.

Referring to FIG. 13, the split channel binding module 114_4 includes a split channel DC processing block 114_41, a channel boundary processing block 114_42, a discontinuous phase processing block 114_43, a calibration compensation block 114_44, an interference frequency interpolation block 114_45, a frequency correction block 114_46, and a real value extraction block 114_47.

The split channel DC processing block 114_41 removes a DC component when a plurality of split channel reflection signals are converted to a baseband. Accordingly, the split channel DC processing block 114_41 may reduce a noise component when a plurality of split channel reflection signals are integrated as an integrated band response signal.

The channel boundary processing block 114_42 removes the overlapping components of the channel boundary of split channel reflection signals received through a plurality of channels.

The discontinuous phase processing block 114_43 detects a phase discontinuity of a channel boundary in order to process a phase to be continuous.

The calibration compensation block 114_44 operates in a continuous scan mode and performs a compensation function by using a calibration value calculated in a calibration compensation mode.

The interference frequency interpolation block 114_45 operates in a continuous scan mode and performs an interpolation operation by using an interference avoidance value calculated in an interference recognition mode.

The frequency correction block 114_46 operates in a continuous scan mode and performs an operation for correcting a frequency through 0 prepanding and frequency windowing.

The real value extraction block 114_47 extracts a real value through an IFFT calculation.

Figure 14:
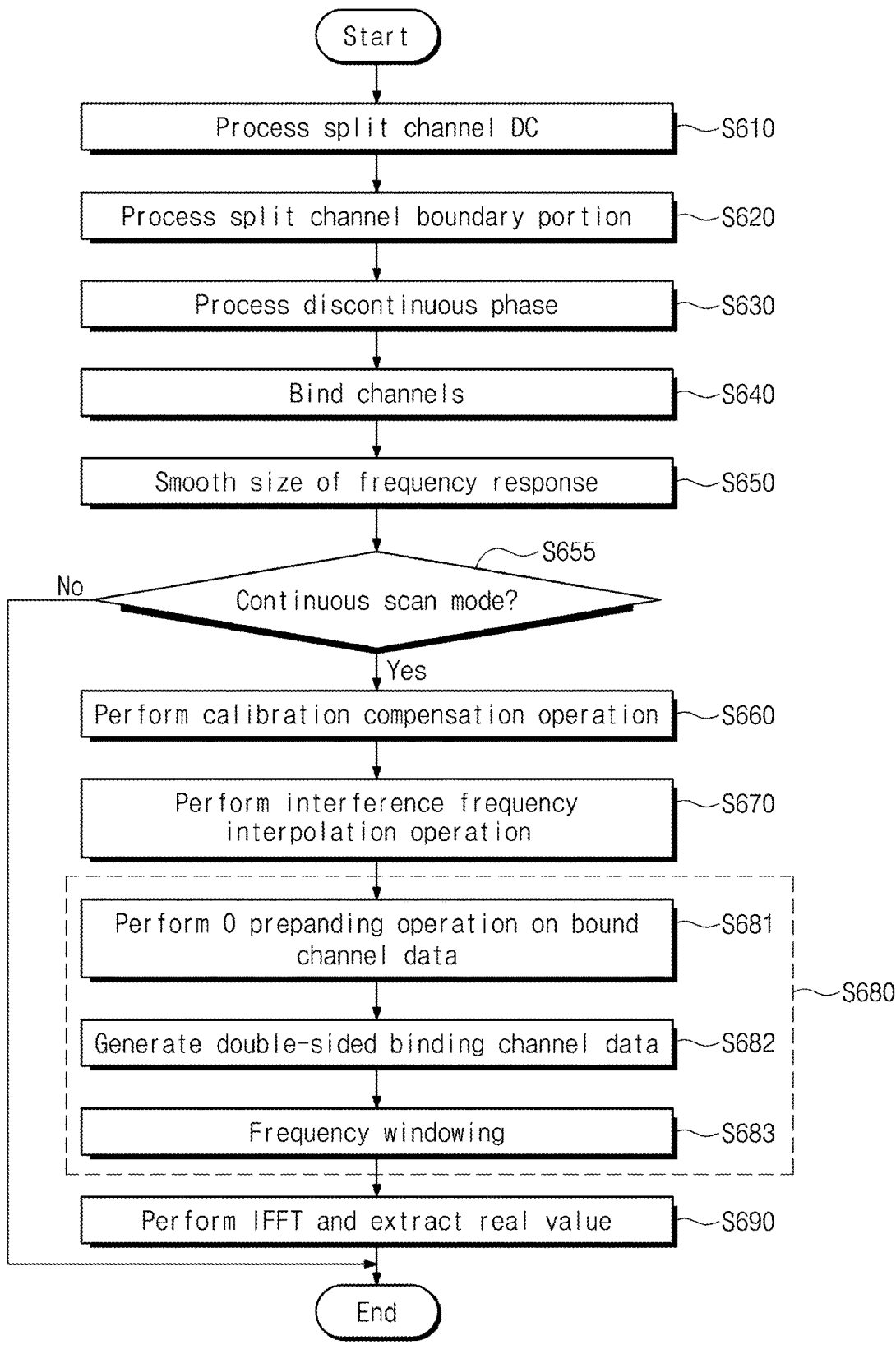
FIG. 14 is a flowchart illustrating a split channel binding function performed by a split channel binding module of FIG. 13 according to an embodiment of the inventive concept.

FIG. 14 is a flowchart illustrating a split channel binding function performed by the split channel binding module 114_4 of FIG. 13 according to an embodiment of the inventive concept.

In operation S610, once a split channel binding function starts, the split channel DC processing block 114_41 process a Direct Current (DC) portion of a split channel.

In operation S620, the channel boundary processing block 114_42 processes a boundary portion of a split channel to match a start channel, a middle channel, and an end channel.

In operation S630, the discontinuous phase processing block 114_43 processes a discontinuous phase between split channels and in operation S640, a plurality of split channel reflection signals having noise removed are bound as one integrated band signal.

In operation S650, a size smoothing operation for frequency response is performed and in operation S655, it is determined whether an operating mode is a continuous scan mode.

If the operating mode is a calibration mode or an interference recognition mode, a split channel binding function is terminated.

If the operating mode is a continuous scan mode, in operation S660, the calibration compensation block 114_44 performs a calibration compensation function. The calibration compensation block 114_44, for example, may perform a calibration compensation function by multiplying binding channel data, which is obtained by performing size smoothing for frequency response and a calibration compensation value.

In operation S670, the interference frequency interpolation block 114_45 performs an interpolation operation by using an interference avoidance value.

In operation S680, the frequency correction block 114_46 performs a frequency correction function. In more detail, the frequency correction block 114_46 prepands 0 to the bound channel data in operation S681 and generates double-sided binding channel data in operation S682. Then, the frequency correction block 114_46 performs frequency windowing on the double-sided binding channel in operation S683 The frequency correction block 114_46 may also perform upsampling additionally through 0 insertion.

Then, in operation S690, the real value extraction block 114_47 performs inverse FFT and extracts a real value of the result.

Figure 15:
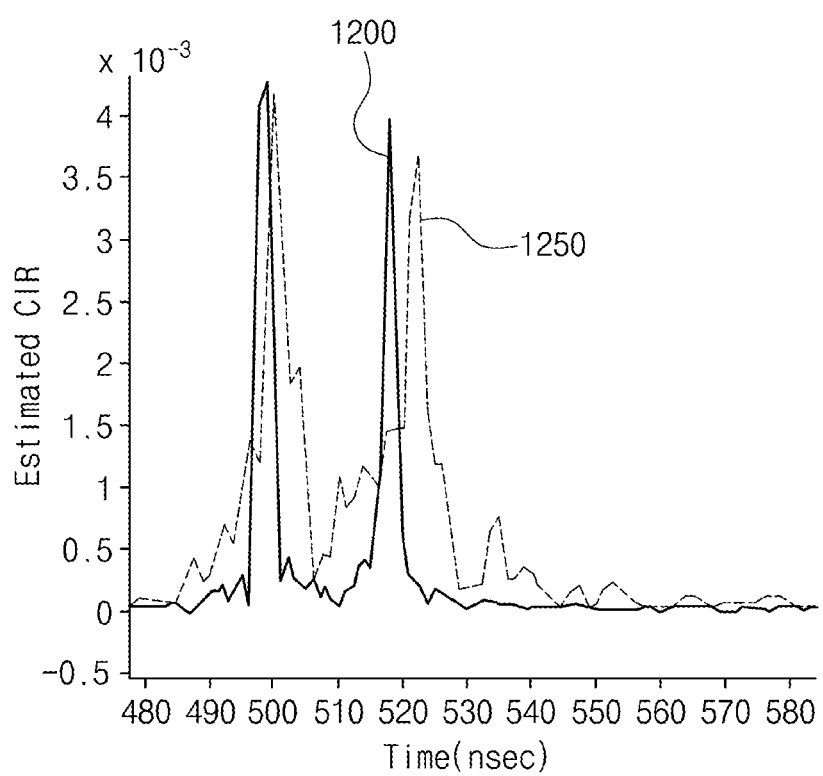
FIG. 15 is a comparison graph of an integrated band response signal before/after channel boundary processing.

FIG. 15 is a comparison graph of an integrated band response signal before/after channel boundary processing.

A severe distortion occurs in the integrated band response signal 1250 before channel boundary processing (a dotted line) but distortion is reduced in the integrated band response signal 1200 after channel boundary processing (a solid line), so that a real response impulse may be measured easily.

Figure 16A:
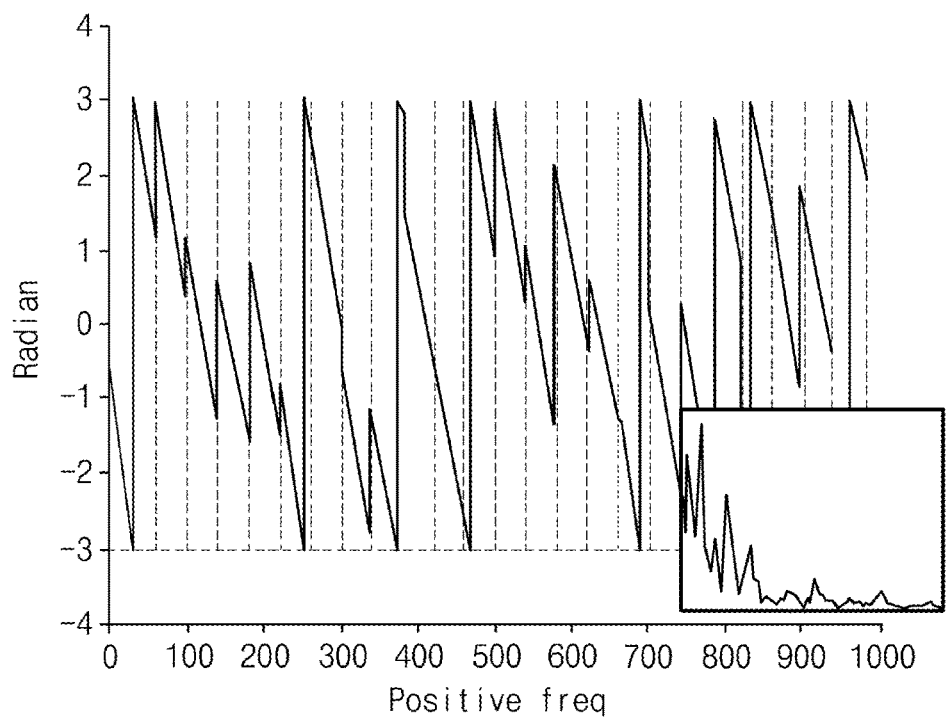
FIGS. 16A and 16B are graphs comparing an output signal before and after discontinuous phase processing and an impulse response according thereto.
Figure 16B:
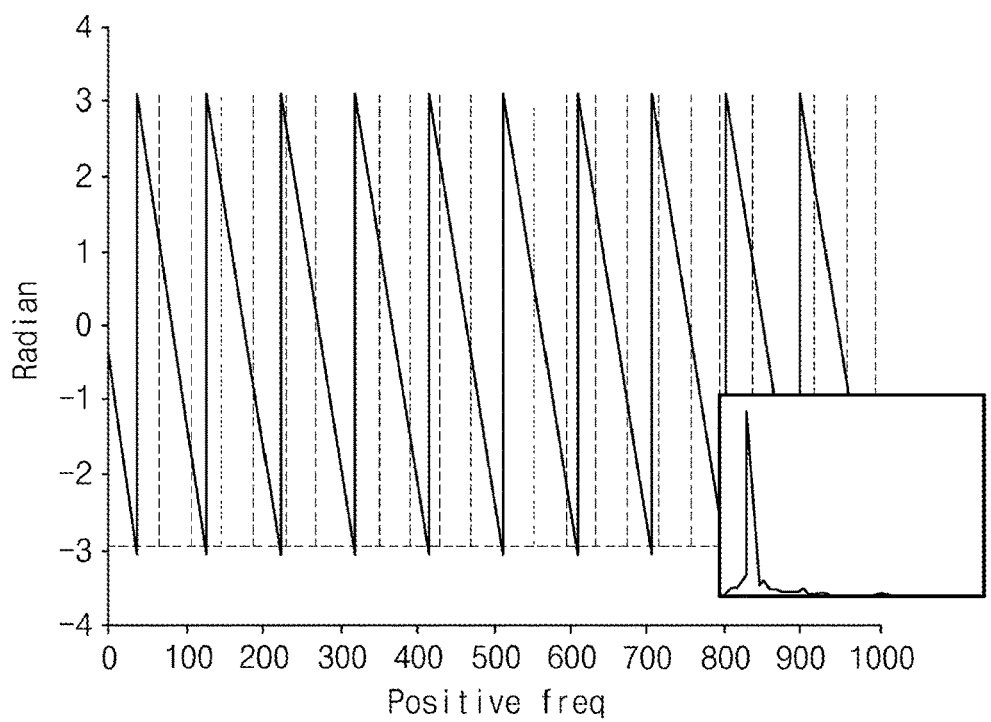

FIGS. 16A and 16B are graphs comparing an output signal before and after discontinuous phase processing and an impulse response according thereto.

Referring to FIG. 16A, phases do not match each other and thus a saw-toothed form is shown at a channel boundary that is a portion indicated by a dotted line. Accordingly, it is checked that impulse response characteristics shown at the right lower end are poor.

Referring to FIG. 16B, it is checked that all the phases match each other at a dotted line portion, that is, a channel boundary area. Accordingly, it is checked that an impulse response shown at the right lower end is improved.

Figure 17A:
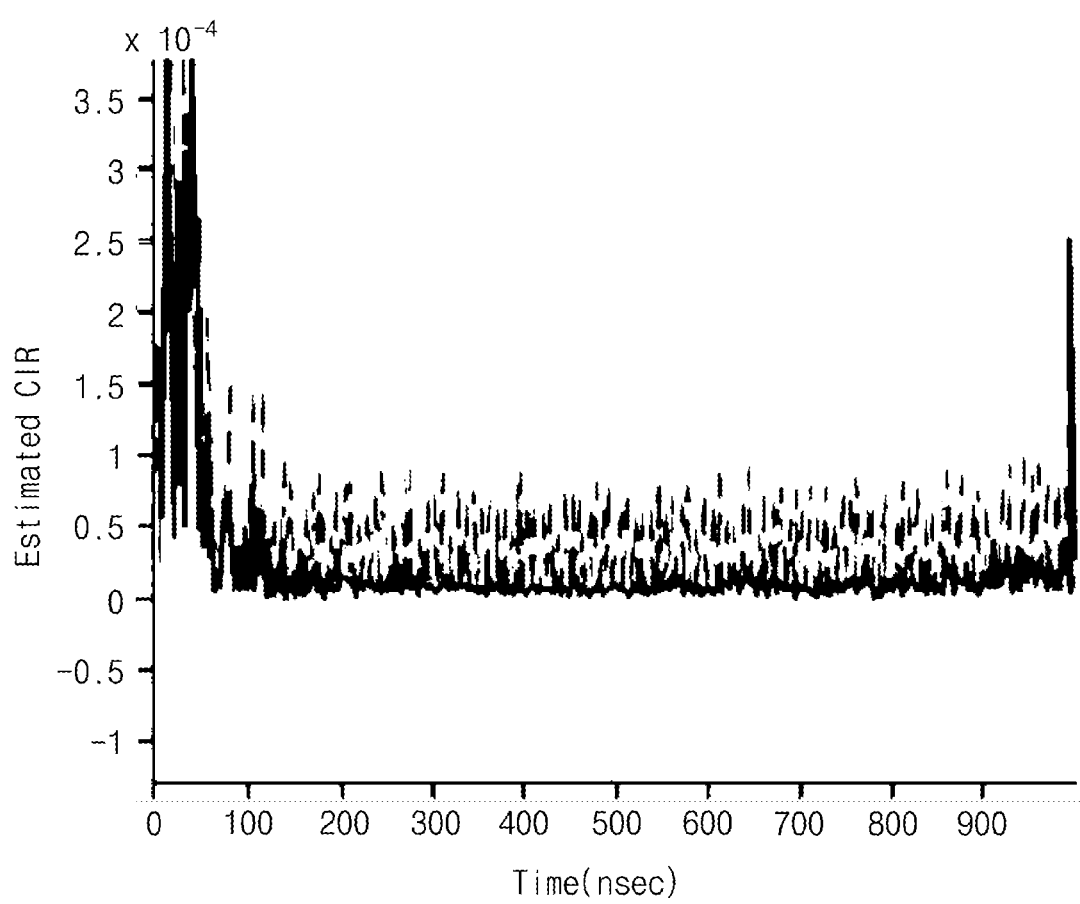
FIGS. 17A and 17B are graphs illustrating a channel impulse response before/after split channel DC processing.
Figure 17B:
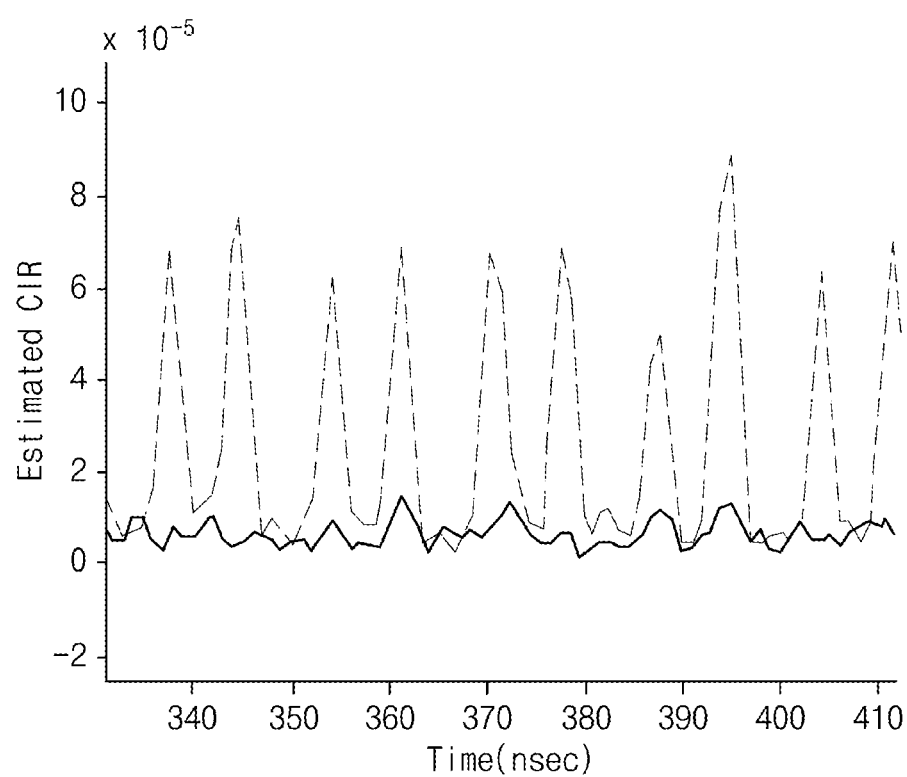

FIGS. 17A and 17B are graphs illustrating a channel impulse response before/after split channel DC processing.

As shown in FIG. 17A, when a DC area component is removed by each channel, it is checked that pulse train distortion does not occur.

FIG. 17B is an enlarged view of a portion of FIG. 17A and when a case that a channel specific DC area component is removed (a solid line) is compared to a case that it is not removed (a dotted line), it is checked that pulse train distortion is reduced significantly.

Figure 18A:
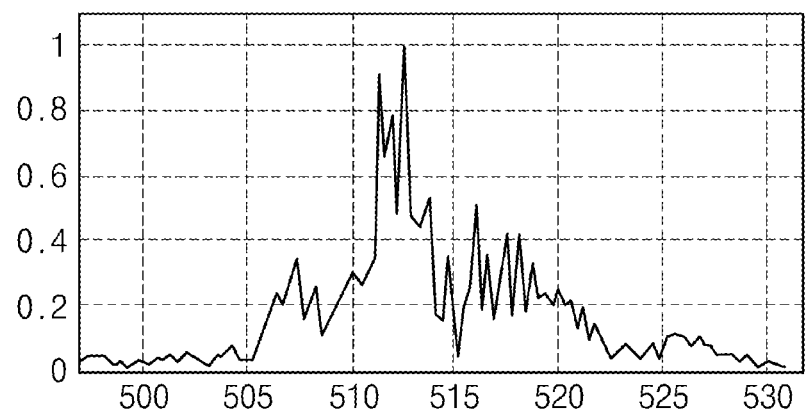
FIGS. 18A and 18B are views illustrating a reception radar signal before and after a split channel interference signal interpolation operation is applied.
Figure 18B:
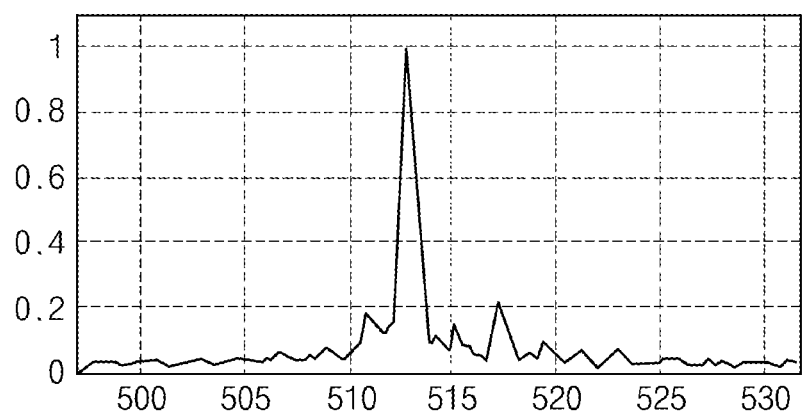

FIGS. 18A and 18B are views illustrating a reception radar signal before and after a split channel interference signal interpolation operation is applied.

As shown in FIG. 18A, it is checked that in relation to an output value of a radar in a state that an interference signal is not processed, due to various interference signals, a radar pulse is distorted non-uniformly.

FIG. 18B illustrates an output value after an interference signal is processed by the split channel interference signal interpolation operation suggested by the inventive concept and it is checked that as an interference signal is processed, a neat radar pulse value is obtained.

Figure 19:
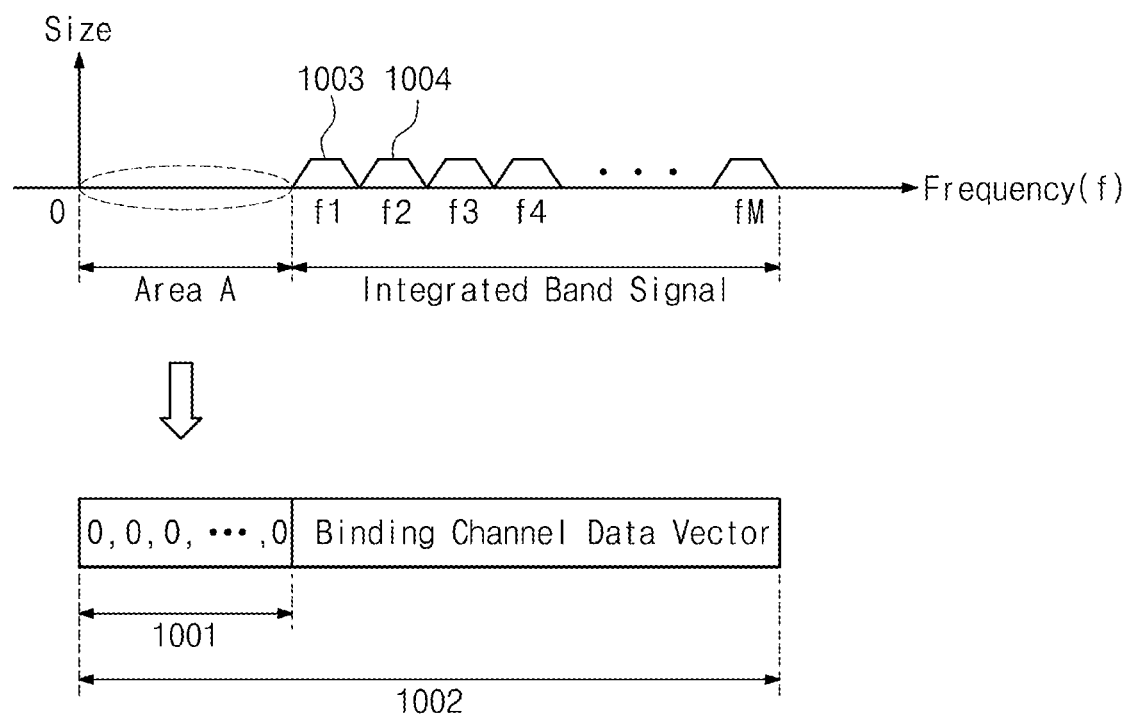
FIG. 19 is a view illustrating a 0 prepanding method of FIG. 14.

FIG. 19 is a view illustrating the 0 prepanding method of FIG. 14.

As shown in FIG. 19, an integrated data vector 1002 may be generated by prepanding a 0 vector 1001 to a binding channel data vector. In this case, the size N of the 0 vector 1001 is calculated by $N=f_{1st}/\Delta f$, and $f_{1st}$ is a real frequency value of the first factor 1003 of bonding channel data, and $\Delta f$ is a real frequency interval value between continuous factors (for example, 1003 and 1004) of binding channel data.

Figure 20:
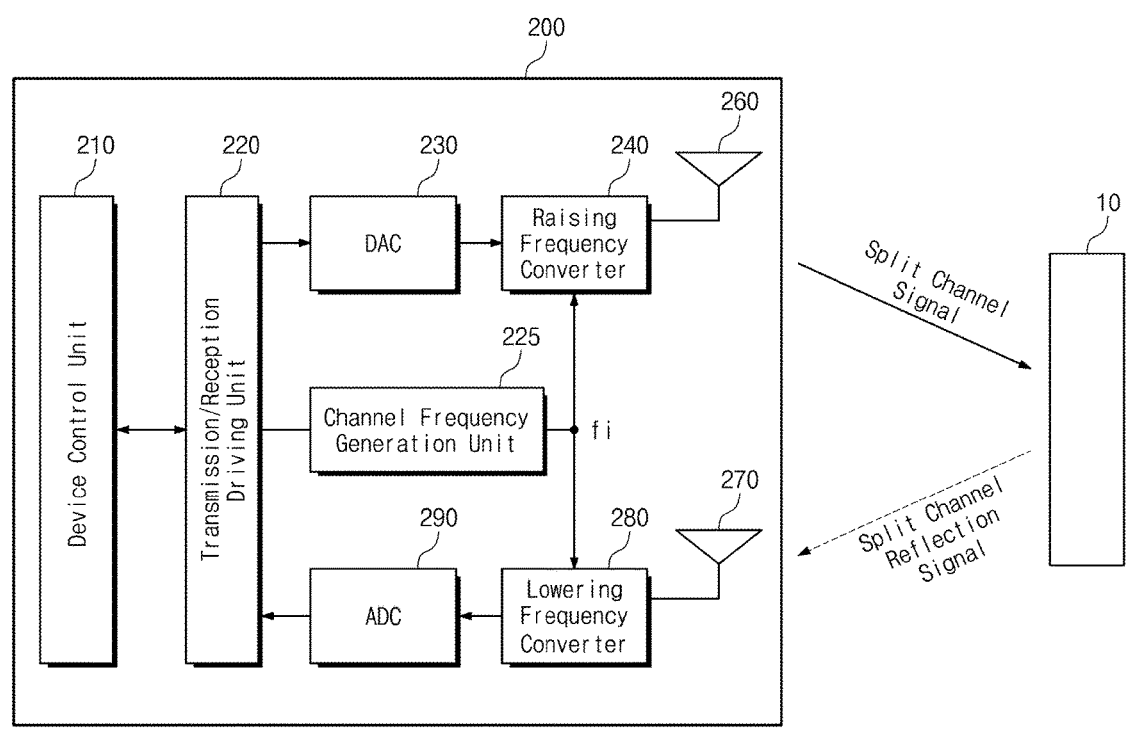
FIG. 20 is a block diagram illustrating a radar device exemplarily according to another embodiment of the technical ideal of the inventive concept.

FIG. 20 is a block diagram illustrating a radar device 200 exemplarily according to another embodiment of the technical ideal of the inventive concept. The radar device 200 of FIG. 20 is similar to the radar device 100 of FIG. 1. Accordingly, similar components are displayed using similar reference numerals and for concise description, the same or similar contents are omitted.

Referring to FIG. 20, the radar device 200 includes a device control unit 210, a transmission/reception driving unit 220, a DAC 230, a raising frequency converter 240, a transmission antenna 260, a reception antenna 270, a lowering frequency converter 280, and an ADC 290.

Unlike the radar device 200 of FIG. 1, each of the transmission antenna 260 and the reception antenna 270 of the radar device 200 of FIG. 20 is implemented as a single antenna. Additionally, since each of the transmission antenna 260 and the reception antenna 270 is implemented as a single antenna, the radar device 200 of FIG. 20 does not include an antenna switch. In this case, the radar device 200 may transmit and receive split channel signals and split channel reflection signals through a single antenna.

As mentioned above, a radar device and an operation method thereof according to an embodiment of the inventive concept may perform a scan operation on a target object at a high speed by transmitting and receiving a plurality of split channel signals on the basis of an OFDM method.

Additionally, a radar device and an operation method thereof according to an embodiment of the inventive concept support a calibration mode, an interference recognition mode, and a continuous scan mode, and support a calibration compensation function and an interference frequency interpolation function by using values calculated in the calibration mode and the interference recognition mode, thereby improving the accuracy of an impulse response.

Furthermore, a radar device and an operation method thereof according to an embodiment of the inventive concept may improve the accuracy of an impulse response by selectively removing a component in a phase discontinuous and overlapping band of a channel boundary when binding a plurality of split channel signals.

Additionally, a radar device and an operation method thereof according to an embodiment of the inventive concept may further improve the accuracy of an impulse response by supporting a frequency correcting function of an integrated band response signal.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A radar device comprising:
a raising frequency converter configured to raise each of frequencies of a plurality of split channel signals from a baseband to a different passband on the basis of a channel frequency;
a transmission antenna configured to transmit the plurality of split channel signals received from the raising frequency converter to a target object;
a reception antenna configured to receive a plurality of split channel reflection signals received from the target object;
a lowering frequency converter configured to lower the frequencies of the plurality of split channel reflection signals from different passbands to a baseband on the basis of the channel frequency;
a transmission/reception driving unit configured to dataframe the plurality of split channel reflection signals received from the lowering frequency converter; and
a device control unit configured to generate an integrated band response signal by using the plurality of dataframed split channel reflection signals.

2. The radar device of claim 1, further comprising:
a digital to analog converter configured to convert the plurality of split channel signals from digital signals to analog signals; and
an analog to digital converter configured to convert the plurality of split channel reflection signals from analog signals to digital signals.

3. The radar device of claim 1, further comprising a channel frequency generation unit configured to generate the channel frequency in order for the plurality of split channel signals to match different passbands, respectively.

4. The radar device of claim 1, wherein the transmission antenna comprises at least two sub antennas for transmission, and the reception antenna comprises at least two sub antennas for reception,
further comprising an antenna switch configured to select at least one sub antenna for transmission from the at least two sub antennas for transmission and select at least one sub antenna for reception from the at least two sub antennas for reception.

5. The radar device of claim 1, wherein the device control unit comprises:
a system initialization unit configured to initialize a state of the transmission/reception driving unit;
a gain control unit configured to set an amplifier gain of the raising frequency converter and the lowering frequency converter; and
a radar scan unit configured to perform a scan operation on the target object through operations for transmitting the plurality of split channel signals and receiving the plurality of split channel reflection signals.

6. The radar device of claim 5, wherein the device control unit further comprises an operation control unit configured to control the system initialization unit, the gain control unit, and the radar scan unit,
wherein the operation control unit performs at least one operating mode among a continuous scan mode for performing a continuous scan operation on the target object, an interference recognition mode for determining whether an external interference signal different from the plurality of split channel reflection signals is received, and a calibration mode for measuring frequency characteristics of the raising frequency converter and the lowering frequency converter.

7. The radar device of claim 6, wherein the transmission antenna comprises at least two sub antennas for transmission and the reception antenna comprises at least two sub antennas for reception,
wherein when the calibration mode or the continuous scan mode is performed, the system initialization unit sets a switching order between the at least two sub antennas for transmission and the at least two sub antennas for reception.

8. The radar device of claim 7, wherein when the interference recognition mode is performed, the system initialization unit sets a sub antenna selected from the at least two sub antennas for transmission as a fixed transmission antenna and sets a sub antenna selected from the at least two sub antenna for reception as a fixed reception antenna.

9. The radar device of claim 5, wherein the gain control unit comprises:
a channel power measurement module configured to measure a channel specific power of the plurality of split channel reflection signals;
an amplifier gain calculation module configured to calculate an amplifier gain of the raising frequency converter and the lowering frequency converter on the basis of channel specific power information measured by the channel power measurement module; and
an amplifier gain setting module configured to set an amplifier gain of the raising frequency converter and the lowering frequency converter on the basis of an amplifier gain calculated by the amplifier gain calculation module.

10. The radar device of claim 9, wherein the device control unit supports at least one operating mode among a continuous scan mode for performing a continuous scan operation on the target object, an interference recognition mode for determining whether an external interference signal different from the plurality of split channel reflection signals is received, and a calibration mode for measuring frequency characteristics of the raising frequency converter and the lowering frequency converter,
wherein when the interference recognition mode is performed, the amplifier gain setting module sets an amplifier gain of the raising frequency converter and the lowering frequency converter as a first gain value,
wherein when the calibration mode or the continuous scan mode is performed, the amplifier gain setting module sets a gain of the raising frequency converter and the lowering frequency converter as a second gain value less than the first gain value.

11. The radar device of claim 10, wherein the amplifier gain setting module sets an amplifier gain of the raising frequency converter and the lowering frequency converter as a third gain value different from the first gain value and the second gain value on the basis of an amplifier gain calculated by the amplifier gain calculation module.

12. The radar device of claim 5, wherein the device control unit supports at least one operating mode among a continuous scan mode for performing a continuous scan operation on the target object, an interference recognition mode for determining whether an external interference signal different from the plurality of split channel reflection signals is received, and a calibration mode for measuring frequency characteristics of the raising frequency converter and the lowering frequency converter,
wherein the radar scan unit comprises:
a split channel binding module configured to generate an integrated band response signal by binding the plurality of split channel reflection signals;

a calibration compensation value calculation module configured to calculate a calibration compensation value by using a binding result of the plurality of split channel reflection signals in the calibration mode; and an interference avoidance value calculation module configured to calculate an interference avoidance value by using a binding result of the plurality of split channel reflection signals in the interference recognition mode.

13. The radar device of claim 12, further comprising, when the calibration mode or the interference recognition mode is performed, a scan performance count module configured to count the number of radar scan performances performed by the radar scan unit.

14. The radar device of claim 12, wherein the split channel binding module comprises:

a calibration compensation block configured to perform a calibration compensation operation on an integrated band response signal by using the calibration compensation value; and an interference frequency correction block configured to perform an interference frequency interpolation operation on the integrated band response signal by using the interference avoidance value.

15. The radar device of claim 14, wherein the calibration compensation operation and the interference frequency interpolation operation are performed in the continuous scan mode.

16. The radar device of claim 14, further comprising a frequency correction block configured to perform a prepanding operation for inserting a zero vector to a data vector corresponding to the integrated band response signal.

* * * * *